US012712449B2

(12) United States Patent
Lee et al.

(10) Patent No.: US 12,712,449 B2
(45) Date of Patent: Aug. 18, 2026

(54) SWITCHED CAPACITOR CIRCUIT AND BIDIRECTIONAL SWITCHING CONVERTER INCLUDING THE SAME

(71) Applicant: Samsung Electronics Co., Ltd., Suwon-si (KR)

(72) Inventors: Sungwoo Lee, Suwon-si (KR); Sungwoo Moon, Suwon-si (KR); Daewoong Cho, Suwon-si (KR); Youngwoo Park, Suwon-si (KR); Jinwoo So, Suwon-si (KR); Yonghwan Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 91 days.

(21) Appl. No.: 18/806,085

(22) Filed: Aug. 15, 2024

(65) Prior Publication Data

US 2025/0062686 A1 Feb. 20, 2025

(30) Foreign Application Priority Data

Aug. 17, 2023 (KR) ........................ 10-2023-0107929
Jan. 18, 2024 (KR) ........................ 10-2024-0008300

(51) Int. Cl.
*H02M 3/07* (2006.01)
*H02J 7/90* (2026.01)

(52) U.S. Cl.
CPC ................. *H02M 3/07* (2013.01); *H02J 7/90* (2026.01); *H02J 2207/20* (2020.01)

(58) Field of Classification Search
None
See application file for complete search history.

(56) References Cited

U.S. PATENT DOCUMENTS

| | | | |
|---|---|---|---|
| 8,362,824 B2 | 1/2013 | Wong et al. |
| 10,289,146 B2 | 5/2019 | Puggelli et al. |
| 10,903,739 B2 | 1/2021 | Toni |
| 11,594,956 B2 | 2/2023 | Jong et al. |
| 2021/0099085 A1 | 4/2021 | Lau |
| 2023/0134427 A1 | 5/2023 | Liu et al. |
| 2023/0155494 A1 | 5/2023 | Zhao et al. |

FOREIGN PATENT DOCUMENTS

| | | | | |
|---|---|---|---|---|
| KR | 10-2023-0092341 A | | 6/2023 | |
| KR | 20230092341 A | * | 6/2023 | .......... H02M 1/0067 |

* cited by examiner

*Primary Examiner* — Crystal L Hammond
*Assistant Examiner* — Seung Ho Choi
(74) *Attorney, Agent, or Firm* — Fish & Richardson P.C.

(57) ABSTRACT

A switched capacitor circuit includes first, third, fifth and seventh switches connected to each other, second, fourth, sixth and eighth switches connected to each other, one end of each of the first and second switches connected to an input node, ninth and tenth switches connected to each other, eleventh and twelfth switches connected to each other, thirteenth and fourteenth switches connected to each other, fifteenth and sixteenth switches connected to each other, a first capacitor between the first and ninth switches, a second capacitor between the second and fifteenth switches, a third capacitor between the third and eleventh switches, a fourth capacitor between the fourth and thirteenth switches, a fifth capacitor between the sixth and eleventh switches, and a sixth capacitor between the fifth and thirteenth switches, one end of each of the ninth, eleventh, thirteenth, fifteenth, seventh and eighth switches connected to an output node.

20 Claims, 18 Drawing Sheets

FIG. 2

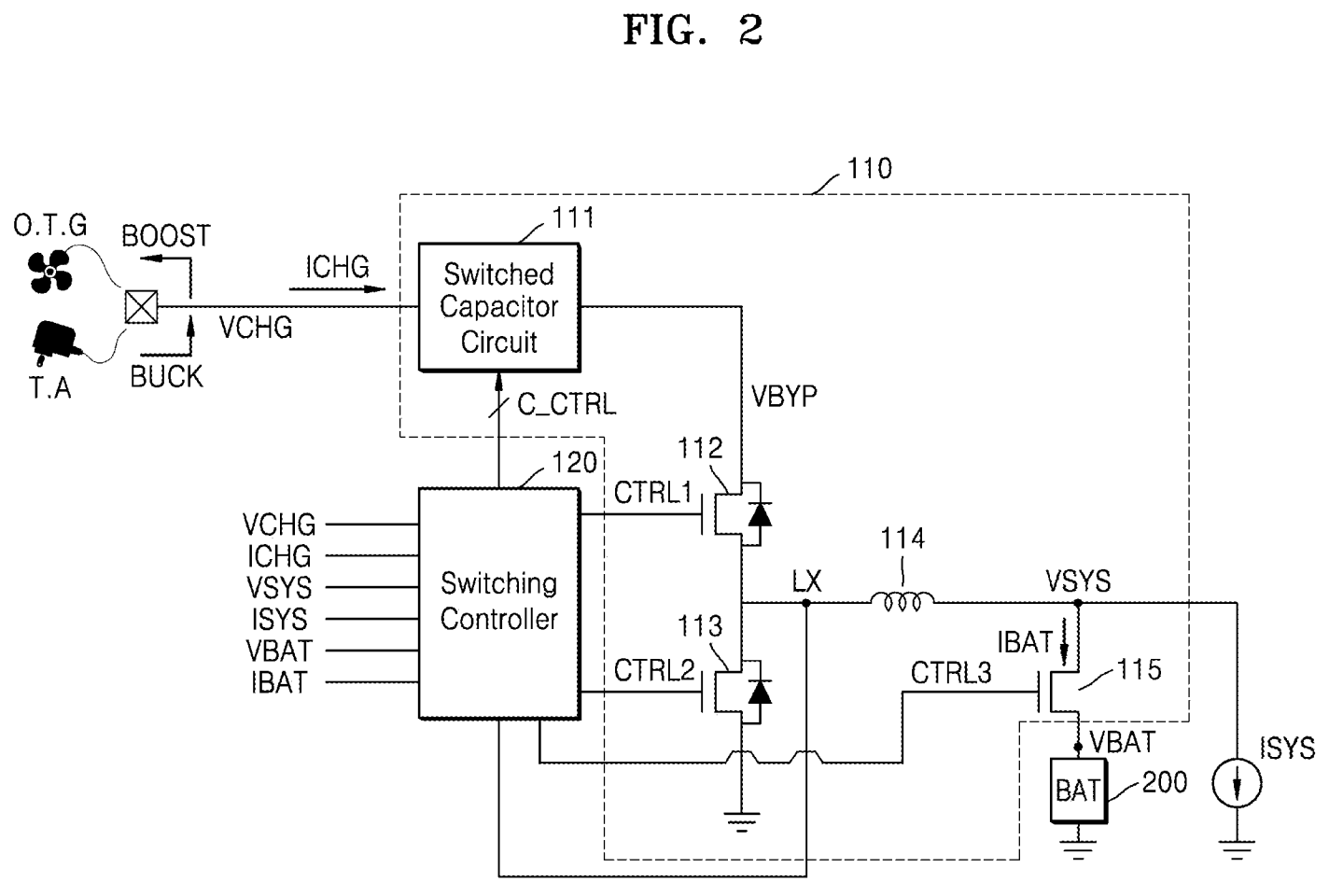

110
111
Switched Capacitor Circuit
C_CTRL
120
Switching Controller
VBYP
112
113
CTRL1
CTRL2
LX
114
CTRL3
IBAT
VSYS
115
VBAT
200
BAT
ISYS
ICHG
VCHG
BOOST
BUCK
O.T.G
T.A
VCHG
ICHG
VSYS
ISYS
VBAT
IBAT

SWITCHED CAPACITOR CIRCUIT AND BIDIRECTIONAL SWITCHING CONVERTER INCLUDING THE SAME

CROSS-REFERENCE TO RELATED APPLICATIONS

This application is based on and claims priority under 35 U.S.C. § 119 to Korean Patent Application No. 10-2023-0107929, filed on Aug. 17, 2023 in the Korean Intellectual Property Office, and Korean Patent Application No. 10-2024-0008300, filed on Jan. 18, 2024 in the Korean Intellectual Property Office, the disclosures of each of which are incorporated by reference herein in their entireties.

BACKGROUND

The inventive concepts relate to switched capacitor circuits and directional switching converters including the same.

The switched capacitor converter is widely used for ultra-fast charging of a mobile system (e.g., a smartphone, a tablet, etc.).

The switched capacitor converter, which is a circuit that combines a semiconductor switching element (hereinafter, simply referred to as a "switch") with a capacitor without using an inductor, may change the connection between the capacitor and the switch through the on/off operation of the switch, thereby changing the relationship between an input voltage and an output voltage.

In the mobile system, the switched capacitor converter mainly operates at a voltage conversion ratio (a ratio of an input voltage to an output voltage) of 2:1. However, as the power consumption of the mobile system has recently increased and the operating voltage of power-consuming elements (e.g., core, peripheral circuits, etc.) within the system has decreased, converters with a voltage conversion ratio exceeding 2:1 are required.

Additionally, since relatively large power may need to be provided to the mobile system during fast charging, the voltage provided to the mobile system may need to be relatively large.

SUMMARY

Some example embodiments of the inventive concepts provide a switched capacitor circuit having circuit structures corresponding to a plurality of voltage conversion ratios through switching operations.

According to some example embodiments of the inventive concepts, a switched capacitor circuit may include a first switch having one end connected to an input node and another end connected to a first node; a second switch having one end connected to the input node and another end connected to a second node; a third switch having one end connected to the first node and another end connected to a third node; a fourth switch having one end connected to the second node and another end connected to a fourth node; a fifth switch having one end connected to the third node and another end connected to a fifth node; a sixth switch having one end connected to the fourth node and another end connected to a sixth node; a seventh switch having one end connected to the fifth node and another end connected to an output node; an eighth switch having one end connected to the sixth node and another end connected to the output node; a ninth switch having one end connected to the output node and another end connected to a seventh node; a tenth switch having one end connected to the seventh node and another end connected to a first ground node; an eleventh switch having one end connected to the output node and another end connected to a ninth node; a twelfth switch having one end connected to the ninth node and another end connected to a second ground node; a thirteenth switch having one end connected to the output node and another end connected to a tenth node; a fourteenth switch having one end connected to the tenth node and another end connected to a third ground node; a fifteenth switch having one end connected to the output node and another end connected to an eighth node; a sixteenth switch having one end connected to the eighth node and another end connected to a fourth ground node; a first capacitor connected between the first node and the seventh node; a second capacitor connected between the second node and the eighth node; a third capacitor connected between the third node and the ninth node; a fourth capacitor connected between the fourth node and the tenth node; a fifth capacitor connected between the sixth node and the ninth node; and a sixth capacitor connected between the fifth node and the tenth node.

According to some example embodiments of the inventive concepts, there a bidirectional switching converter may include a switched capacitor circuit and a switching controller. The switched capacitor circuit may include a first switch having one end connected to a first input/output node and another end connected to a first node, a second switch having one end connected to the first input/output node and another end connected to a second node, a third switch having one end connected to the first node and another end connected to a third node, a fourth switch having one end connected to the second node and another end connected to a fourth node, a fifth switch having one end connected to the third node and another end connected to a fifth node, a sixth switch having one end connected to the fourth node and another end connected to a sixth node, a seventh switch having one end connected to the fifth node and another end connected to a second input/output node, an eighth switch having one end connected to the sixth node and another end connected to the second input/output node, a ninth switch having one end connected to the second input/output node and another end connected to a seventh node, a tenth switch having one end connected to the seventh node and another end connected to a first ground node, an eleventh switch having one end connected to the second input/output node and another end connected to a ninth node, a twelfth switch having one end connected to the ninth node and another end connected to a second ground node, a thirteenth switch having one end connected to the second input/output node and another end connected to a tenth node, a fourteenth switch having one end connected to the tenth node and another end connected to a third ground node, a fifteenth switch having one end connected to the second input/output node and another end connected to an eighth node, a sixteenth switch having one end connected to the eighth node and another end connected to a fourth ground node, a first capacitor connected between the first node and the seventh node, a second capacitor connected between the second node and the eighth node, a third capacitor connected between the third node and the ninth node, a fourth capacitor connected between the fourth node and the tenth node, a fifth capacitor connected between the sixth node and the ninth node, and a sixth capacitor connected between the fifth node and the tenth node. The switching controller may be configured to generate first to sixteenth control signals to control the first to sixteenth switches, respectively.

BRIEF DESCRIPTION OF THE DRAWINGS

Example embodiments will be more clearly understood from the following detailed description taken in conjunction with the accompanying drawings in which:

FIG. 2 is a diagram of an electronic device according to some example embodiments;

DETAILED DESCRIPTION

Figure 1:
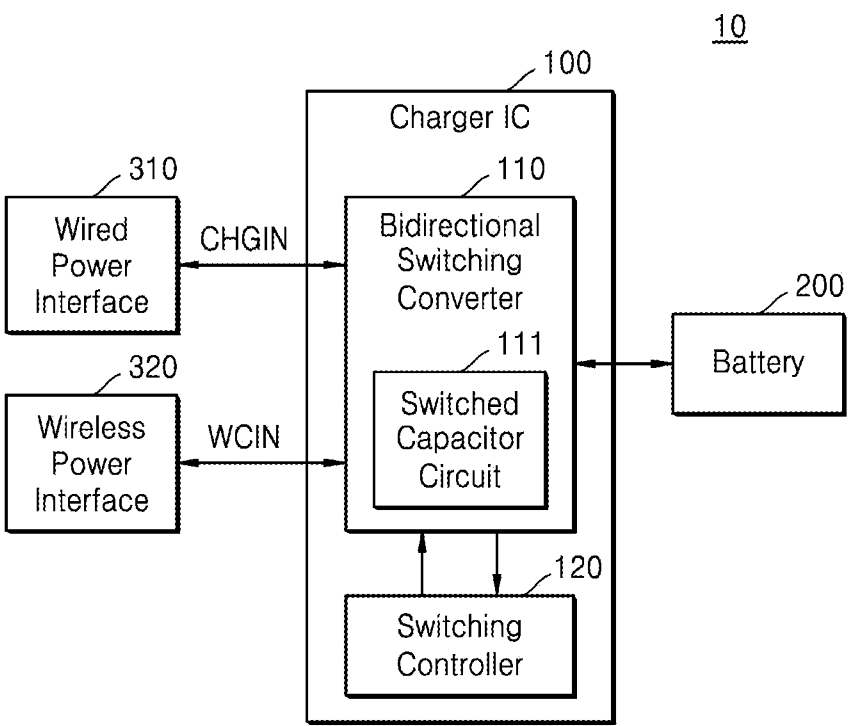
FIG. 1 is a schematic block diagram of an electronic device including a charger integrated circuit according to some example embodiments.

Hereinafter, some example embodiments are described in detail with reference to the accompanying drawings.

In order to clearly explain the present inventive concepts in the drawings, parts that are not related to the description are omitted, and similar parts are given similar reference numerals throughout the specification. In the flowchart described with reference to the drawings, the order of operations may be changed, several operations may be merged, certain operations may be divided, and certain operations may not be performed.

Throughout the specification, the term "connected" does not mean only that two or more constituent components are directly connected, but may also mean that two or more constituent components are indirectly connected through another constituent component. In addition, unless explicitly described to the contrary, the word "comprise", and variations such as "comprises" or "comprising", will be understood to imply the inclusion of stated elements but not the exclusion of any other elements.

It will be understood that elements and/or properties thereof may be recited herein as being "identical", "the same", or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to, equal to or substantially equal to, and/or the same or substantially the same as other elements and/or properties thereof may be structurally the same or substantially the same, functionally the same or substantially the same, and/or compositionally the same or substantially the same. While the term "same," "equal" or "identical" may be used in description of some example embodiments, it should be understood that some imprecisions may exist. Thus, when one element or property is referred to as being identical to, equal to, or the same as another element or property, it should be understood that the element or property is the same as another element or property within a desired manufacturing or operational tolerance range (e.g., +10%).

It will be understood that elements and/or properties thereof described herein as being "substantially" the same, equal, and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., +10%) around the stated elements and/or properties thereof.

When the terms "about" or "substantially" are used in this specification in connection with a numerical value, it is intended that the associated numerical value includes a manufacturing or operational tolerance (e.g., +10%) around the stated numerical value. Moreover, when the words "about" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., +10%) around the stated numerical values or shapes. When ranges are specified, the range includes all values therebetween such as increments of 0.1%.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

FIG. 1 is a schematic block diagram of an electronic device including a charger integrated circuit according to some example embodiments.

Referring to FIG. 1, an electronic device 10 may include a charger integrated circuit (IC) 100 and a battery 200. In addition, the electronic device 10 may further include a main processor and peripheral devices. For example, the electronic device 10 may include a mobile device, such as a smartphone, a tablet personal computer (PC), a mobile phone, a personal digital assistant (PDA), a laptop, a wearable device, a global positional system (GPS) device, and an e-book terminal, a digital broadcasting terminal, an MP3 player, a digital camera, and the like. For example, the electronic device 10 may include an electric vehicle.

The battery 200 may be built into (e.g., included as a part of, located within an interior of, irremovably integrated into, etc.) the electronic device 10. In some example embodiments, the battery 200 may be removable from (e.g., may be detachably coupled to, reversibly coupled to, etc.) the electronic device 10. The battery 200 may include a battery cell or a plurality of battery cells. The plurality of battery cells may be connected in series or in parallel (e.g., connected in series or in parallel with the charger IC 100). When an external charging device is not connected to the electronic device 10 (e.g., in response to the electronic device 10 not being connected to any external charging device), the battery 200 may supply power to the electronic device 10.

The charger IC 100 may charge the battery 200 and may be referred to as a "battery charger." Additionally, the charger IC 100 may supply power to an external device (e.g., a wired interface or a wireless interface) connected to the charger IC 100 based on the voltage used for charging the battery 200. For example, the charger IC 100 may be implemented as an integrated circuit chip and may be mounted on a printed circuit board.

The charger IC 100 may include a bidirectional switching converter 110 and a switching controller 120. The bidirectional switching converter 110 may be implemented as a DC-DC converter and may generate an output voltage by stepping down or stepping up an input voltage.

The bidirectional switching converter 110 may operate in buck mode, boost mode, or buck-boost mode.

In buck mode, the bidirectional switching converter 110 may perform a buck converting operation through a first switching operation to step down the input voltage and charge the battery 200 based on the stepped-down voltage.

In boost mode, the bidirectional switching converter 110 may perform a boost converting operation through a second switching operation to step up the voltage input from the battery 200 and supply power to an external device based on the stepped-up voltage.

In buck-boost mode, the bidirectional switching converter 110 may perform a buck converting operation or a boost converting operation through a third switching operation depending on a load current. In buck-boost mode, the bidirectional switching converter 110 may charge the battery 200 or supply power to an external device.

The switching controller 120 may control mode switching between a plurality of charging modes of the bidirectional switching converter 110, such as buck mode, boost mode, and buck-boost mode, and may control switching operations of the bidirectional switching converter 110 so that the voltage level of the output voltage is the same as or similar to the target voltage level in the plurality of charging modes.

To operate properly even under power saving conditions, the charger IC 100 may support at least one of various functions, such as an under-voltage lockout (UVLO) function, an over-current protection (OCP) function, an over-voltage protection (OVP) function, a soft-start function to reduce an inrush current, a foldback current limit function, a Hiccup mode function for short circuit protection, an over-temperature protection (OTP) function, etc.

In some example embodiments, the electronic device 10 may support wired charging and wireless charging (e.g., wired charging and wireless charging of the electronic device 10) and may include a first power interface 310 and a second power interface 320 respectively for wired charging and wireless charging. In some example embodiments, the first power interface 310 may be implemented as a wired power interface and may include a wired charging circuit. The second power interface 320 is implemented as a wireless power interface and may include a wireless charging circuit.

In buck mode (e.g., based on the bidirectional switching converter 110 operating in buck mode), the charger IC 100 may receive a first input voltage CHGIN from the first power interface 310 and/or a second input voltage WCIN from the second power interface 320, and the charger IC 100 may charge the battery 200 based on the first input voltage CHGIN and/or the second input voltage WCIN.

In boost mode (e.g., based on the bidirectional switching converter 110 operating in boost mode), the charger IC 100 may provide power to the first power interface 310 and/or the second power interface 320 based on the power of the battery 200 (e.g., based on using the battery 200 as a power supply).

In buck-boost mode (e.g., based on the bidirectional switching converter 110 operating in buck-boost mode), the charger IC 100 may receive the first input voltage CHGIN from the first power interface 310 or the second input voltage WCIN from the second power interface 320, the charger IC 100 may charge the battery 200 based on the first input voltage CHGIN or the second input voltage WCIN, and the charger IC 100 may provide power to the first power interface 310 or the second power interface 320 based on the first input voltage CHGIN or the second input voltage WCIN. In some example embodiments, the charger IC 100 may provide power to the second power interface 320 based on the first input voltage CHGIN and the voltage of the battery 200 or the charger IC 100 may provide power to the first power interface 310 based on the second input voltage WCIN and the voltage of the battery 200.

For example, a travel adapter (TA) or an auxiliary battery may be electrically connected to the first power interface 310. The TA may provide power to the electronic device 10 by converting power supplied from a household power source of AC 100 V to 220 V or from other power supply means (e.g., a computer) into DC power that may be required for charging the battery 200. In buck mode or buck-boost mode (e.g., based on the bidirectional switching converter 110 operating in buck mode or buck-boost mode), the charger IC 100 may charge the battery 200 or provide power to the second power interface 320 by using the first input voltage CHGIN received from the TA or the auxiliary battery.

For example, an On-The-Go (OTG) device (e.g., an OTG USB device, etc.) may be connected to the first power interface 310, and the charger IC 100 may provide power to the OTG device through the first power interface 310. The bidirectional switching converter 110 may provide power to the OTG device based on the power of the battery 200 in boost mode or may charge the battery 200 and provide power to the OTG device simultaneously in buck mode, based on the second input voltage WCIN from the second power interface 320.

The bidirectional switching converter 110 according to some example embodiments may include a switched capacitor circuit 111.

The switched capacitor circuit 111 may include a plurality of capacitors and switches. In buck mode (e.g., based on the bidirectional switching converter 110 operating in buck mode), the switched capacitor circuit 111 may step down the input voltage based on various voltage conversion ratios (e.g., based on one voltage conversion ratio of a plurality of voltage conversion ratios) and may charge the battery 200 based on the stepped-down voltage. For example, the switched capacitor circuit 111 may step down the input voltage based on one of the voltage conversion ratios of 4:1, 3:1, or 2:1. The switching controller 120 may control the switched capacitor circuit 111 so that the input voltage is stepped down based on one of the voltage conversion ratios of 4:1, 3:1, or 2:1.

The switched capacitor circuit 111 according to some example embodiments may have a cross-coupled structure. That is, the first structure and the second structure of the switched capacitor circuit 111 are the same structure (e.g., a same or mirrored configuration of switches, nodes, and capacitors), and the first structure and the second structure thereof may be cross coupled to each other. Accordingly, the complexity of the design and process of the switched capacitor circuit 111 may be reduced. As a result, the likelihood of process defects in the switched capacitor circuit 111 may be reduced due to the reduced design complexity and process of the switched capacitor circuit 111, and therefore the switched capacitor circuit 111 and bidirectional switching converter 110, charger IC 100, and electronic device 10 including same may have improved reliability due to the reduced likelihood of process defects Since the switched capacitor circuit 111 steps down the input voltage based on various voltage conversion ratios, the same voltage may be provided to the battery 200 even though the input voltage changes. As a result, the bidirectional switching converter 110, charger IC 100, and electronic device 10 including same may have improved versatility, and thus improved functionality based on being configured to provide a voltage having a certain voltage level (e.g., voltage magnitude) even when the input voltage has various voltage levels.

In boost mode (e.g., based on the bidirectional switching converter 110 operating in boost mode), the switched capacitor circuit 111 may step up the input voltage provided from the battery 200 based on various voltage conversion ratios and may provide the stepped-up voltage to the first power interface 310 or the second power interface 320. For example, the switched capacitor circuit 111 may step up the input voltage based on one of the voltage conversion ratios of 1:4, 1:3, or 1:2. The switching controller 120 may control the switched capacitor circuit 111 so that the input voltage is stepped down based on one of the voltage conversion ratios of 4:1, 3:1, or 2:1. Herein, some example embodiments of operations of the charger IC, bidirectional switching converter 110, switched capacitor circuit 111, and/or switching controller 120 according to the buck mode are mainly described. However, it may be obvious that the description of the buck mode is also applied to the boost mode.

FIG. 2 is a diagram of an electronic device according to some example embodiments.

Referring to FIG. 2, an electronic device 10 may include a bidirectional switching converter 110, a switching controller 120, and a battery 200. In buck mode (e.g., based on the bidirectional switching converter 110 operating in buck mode), the bidirectional switching converter 110 may generate a voltage VSYS by stepping down a voltage VCHG supplied from the TA. Herein, a symbol (e.g., VCHG, VSYS) of a voltage may refer to a node at which the corresponding voltage is measured. In buck mode, a current ISYS, which is a model corresponding to the current consumed by the load, may also be referred to as a load current. The load may receive power from the node VSYS. In boost mode (e.g., based on the bidirectional switching converter 110 operating in boost mode), the bidirectional switching converter 110 may generate the voltage VCHG by stepping up a voltage VBAT of the battery 200. The OTG device may receive power from the node VCHG, and in boost mode, the current consumed by the OTG device may be referred to as a load current.

The bidirectional switching converter 110 may include the switched capacitor circuit 111, a first transistor 112, a second transistor 113, and a third transistor 115.

The switching controller 120 may generate control signals C_CTRL, and CTRL1 to CTRL3 based on at least one of the signals VCHG, VSYS, VBAT, ICHG, and/or IBT.

The first transistor 112 may be turned on according to the control signal CTRL1 to pre-charge a switching node LX based on the level (interchangeably referred to herein as a voltage magnitude) of a voltage VBYP. The second transistor 113 may be turned on according to the control signal CTRL2 to discharge the switching node LX (e.g., discharge the switching node LX to ground, discharge the switching node LX to a ground node, etc.). As the level of the switching node LX changes, the current flowing through the inductor 114 may change and the level of the node VSYS (e.g., the voltage magnitude, voltage node, etc. at the node VSYS) may be determined accordingly.

The third transistor 115 may be turned on according to the control signal CTRL3 to connect the node VSYS to the battery 200 or provide a current IBAT to the battery 200.

In FIG. 2, various circuits are shown. However, in some example embodiments, the bidirectional switching converter 110 may not include at least some of the circuits shown in FIG. 2 other than the switched capacitor circuit 111 (e.g., may not include some or all of the first to third transistors 112, 113, 115, inductor 114, etc.). That is, the node VBYP, which is an output node of the switched capacitor circuit 111, may be directly connected to the node VSYS.

Figure 3:
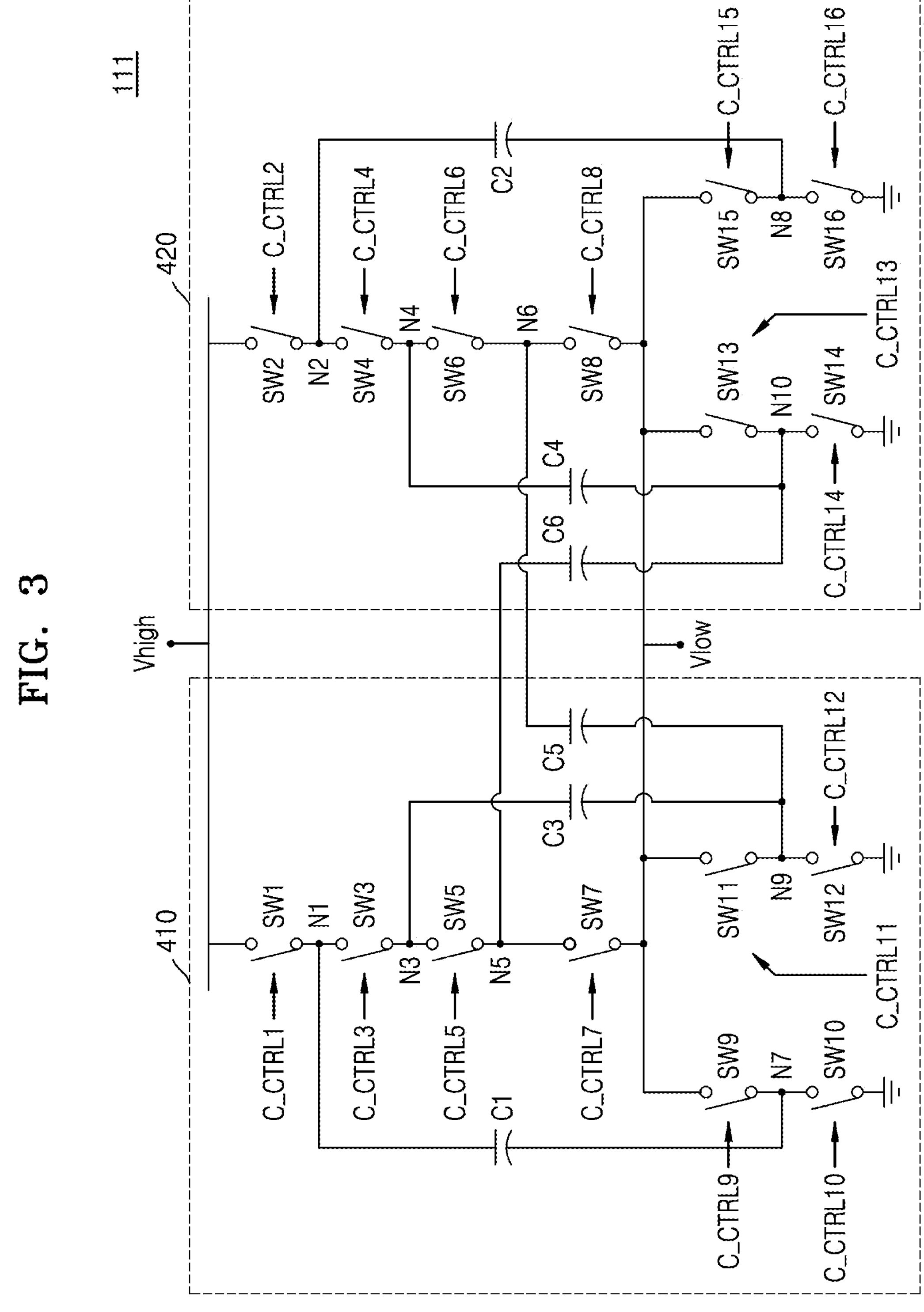
FIG. 3 is a circuit diagram of a switched capacitor circuit according to some example embodiments.

FIG. 3 is a circuit diagram of a switched capacitor circuit 111 according to some example embodiments.

Referring to FIG. 3, in buck mode (e.g., based on the bidirectional switching converter 110 operating in buck mode), the switched capacitor circuit 111 may step down a voltage of a node Vhigh and provide the stepped-down voltage to a node Vlow. In boost mode (e.g., based on the bidirectional switching converter 110 operating in boost mode), the switched capacitor circuit 111 may step up the voltage of the node Vlow and provide the stepped-up voltage to the node Vhigh. Hereinafter, some example embodiments in which, in buck mode, the switched capacitor circuit 111 steps down the voltage of the node Vhigh based on one of a plurality of voltage conversion ratios and provides the stepped-down voltage to the node Vlow are described. However, the switched capacitor circuit 111 may step up the voltage of the node Vlow based on at least one of a plurality of conversion ratios and may provide the stepped-up voltage to the node Vhigh.

The switched capacitor circuit 111 may include a first circuit structure 410 and a second circuit structure 420 that are cross coupled to each other. The first circuit structure 410 may include first, third, fifth, seventh, ninth, tenth, eleventh, and twelfth switches SW1, SW3, SW5, SW7, SW9, SW10, SW11, and SW12 and first, third, and fifth capacitors C1, C3, and C5. The second circuit structure 420 may include second, fourth, sixth, eighth, thirteenth, fourteenth, fifteenth, and sixteenth switches SW2, SW4, SW6, SW8, SW13, SW14, SW15, and SW16, and second, fourth, and sixth capacitors C2, C4, and C6. The first to sixteenth switches SW1 to SW16 may each independently include an N-type transistor or a P-type transistor. Herein, the first to sixteenth switches SW1 to SW16 may be described as each including an N-type transistor. Accordingly, each switch of the first to sixteenth switches SW1 to SW16 may be turned on when a high-level signal is received (e.g., in response to a high-level signal being received) at a respective gate terminal of the switch of the first to sixteenth switches SW1 to SW16. Additionally, each switch of the first to sixteenth switches SW1 to SW16 may be turned off when a low-level signal is received (e.g., in response to a low-level signal being received) at a respective gate terminal of the switch of the first to sixteenth switches SW1 to SW16. However, example embodiments are not limited thereto.

The first to sixteenth switches SW1 to SW16 may be switched by separate, respective control signals C_CTRL1 to C_CTRL16 provided (e.g., transmitted) by the switching controller 120. The first to sixteenth switches SW1 to SW16 may be turned on or turned off based on the corresponding (respective) control signals. The control signals C_CTRL1 to C_CTRL16 may correspond to the control signal C_CTRL of FIG. 2. The switching controller 120 may generate the control signals C_CTRL1 to C_CTRL16 to control the first to sixteenth switches SW1 to SW16, respectively, based on the voltage conversion ratio between the input voltage and the output voltage. When converting a voltage according to a 4:1 voltage conversion ratio, the switching controller 120 may switch the first to sixteenth switches SW1 to SW16 as shown in FIGS. 4 to 7 through the separate, respective (e.g., corresponding) control signals C_CTRL1 to C_CTRL16. When converting a voltage according to a 3:1 voltage conversion ratio, the switching controller 120 may switch the first to sixteenth switches SW1 to SW16 as shown in FIGS. 8 to 11 through the separate, respective (e.g., corresponding) control signals C_CTRL1 to C_CTRL16. When converting a voltage according to a 2:1 voltage conversion ratio, the switching controller 120 may switch the first to sixteenth switches SW1 to SW16 as shown in FIGS. 12 to 15 through the control signals C_CTRL1 to C_CTRL16. For convenience of explanation, the control signals C_CTRL1 to C_CTRL16 may be omitted in FIGS. 4 to 16.

In the first circuit structure 410, one end of the first switch SW1 may be connected to the node Vhigh (also referred to herein in some example embodiments as an input node, an output node, or a first input/output node) and the other end thereof (e.g., another end thereof) may be connected to a first node N1. One end of the third switch SW3 may be connected to the first node N1 and the other end thereof may be connected to a third node N3. One end of the fifth switch SW5 may be connected to the third node N3 and the other end thereof may be connected to a fifth node N5. One end of the seventh switch SW7 may be connected to the fifth node N5 and the other end thereof may be connected to the node Vlow (also referred to herein in some example embodiments as an output node, an input node, or a second input/output node). One end of the ninth switch SW9 may be connected to the node Vlow and the other end thereof may be connected to a seventh node N7. One end of the tenth switch SW10 may be connected to the seventh node N7 and the other end thereof may be connected to a ground node (e.g., ground, a first ground node, etc.). One end of the eleventh switch SW11 may be connected to the node Vlow and the other end thereof may be connected to a ninth node N9. One end of the twelfth switch SW12 may be connected to the ninth node N9 and the other end thereof may be connected to a ground node (e.g., ground, a second ground node, etc.). It will be understood that each switch of the first to sixteenth switches SW1 to SW16 may be referred to as having one end connected to a certain node and another end connected to another node, where the switch is configured to selectively close or open a conductive path between said nodes through the switch (e.g., selectively electrically connect or electrically isolate said nodes through the switch) based on a control signal transmitted to the switch. For example, the first switch SW1 may be understood to be a switch having one end connected to an input node (e.g., Vhigh) and another end connected to a first node N1, and the first switch SW1 may thus be understood to be configured to selectively close or open a conductive path between said nodes Vhigh and N1 through the first switch SW1 (e.g., selectively electrically connect or electrically isolate said nodes through the first switch SW1) based on a first control signal C_CTRL1 received at the first switch SW1. In some example embodiments, the node Vhigh may be referred to herein as a first input/output node and the node Vlow may be referred to herein as a second input/output node.

In the first circuit structure 410, one end of the first capacitor C1 may be connected to the first node N1 and the other end thereof may be connected to the seventh node N7, such that the first capacitor C1 may be connected between (e.g., directly between) the first node N1 and the seventh node N7. One end of the third capacitor C3 may be connected to the third node N3 and the other end thereof may be connected to the ninth node N9, such that the third capacitor C3 may be connected between (e.g., directly between) the third node N3 and the ninth node N9. One end of the fifth capacitor C5 may be connected to a sixth node N6 and the other end thereof may be connected to the ninth node N9, such that the fifth capacitor C5 may be connected between (e.g., directly between) the sixth node N6 and the ninth node N9.

In the second circuit structure 420, one end of the second switch SW2 may be connected to the node Vhigh and the other end thereof may be connected to the second node N2. One end of the fourth switch SW4 may be connected to the second node N2 and the other end thereof may be connected to the fourth node N4. One end of the sixth switch SW6 may be connected to the fourth node N4 and the other end thereof may be connected to the sixth node N6. One end of the eighth switch SW8 may be connected to the sixth node N6 and the other end thereof may be connected to the node Vlow. One end of the thirteenth switch SW13 may be connected to the node Vlow and the other end thereof may be connected to a tenth node N10. One end of the fourteenth switch SW14 may be connected to the tenth node N10 and the other end thereof may be connected to a ground node (e.g., ground, a third ground node, etc.). One end of the fifteenth switch SW15 may be connected to the node Vlow and the other end thereof may be connected to an eighth node N8. One end of the sixteenth switch SW16 may be connected to the eighth node N8 and the other end thereof may be connected to a ground node (e.g., ground, a fourth ground node, etc.).

In the second circuit structure 420, one end of the second capacitor C2 may be connected to the second node N2 and the other end thereof may be connected to the eighth node N8, such that the second capacitor C2 may be connected between (e.g., directly between) the second node N2 and the eighth node N8. One end of the fourth capacitor C4 may be connected to the fourth node N4 and the other end thereof may be connected to the tenth node N10, such that the fourth capacitor C4 may be connected between (e.g., directly between) the fourth node N4 and the tenth node N10. One end of the sixth capacitor C6 may be connected to the fifth node N5 of the first circuit structure 410 and the other end thereof may be connected to the tenth node N10, such that the sixth capacitor C6 may be connected between (e.g., directly between) the fifth node N5 and the tenth node N10.

Figure 4:
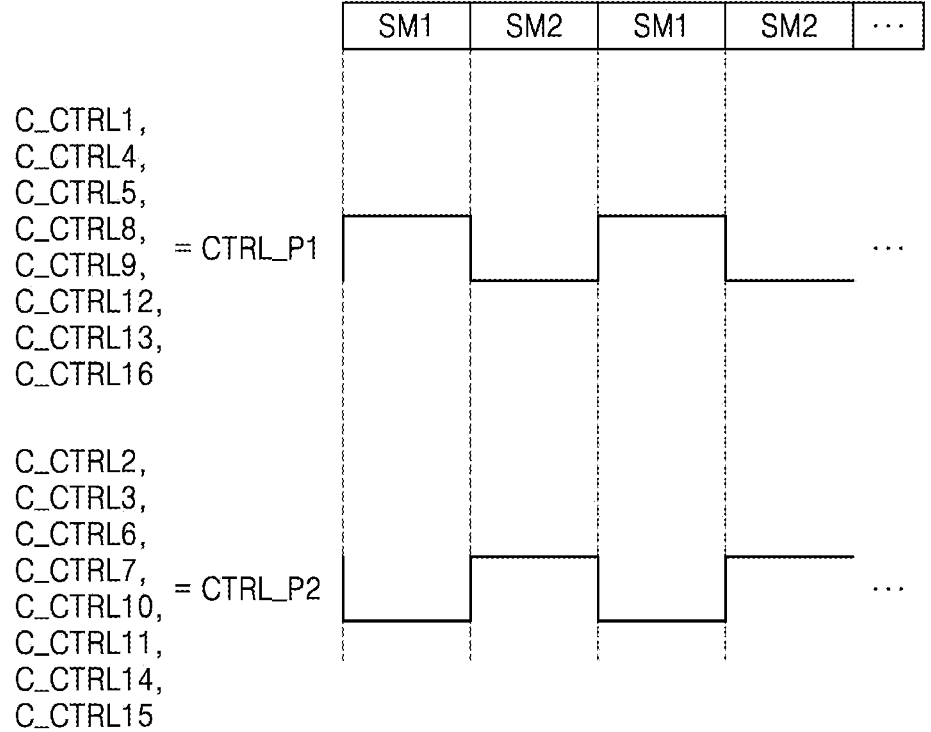
FIG. 4 is a timing diagram of control signals during a 4:1 buck converting operation according to some example embodiments.
Figure 5:
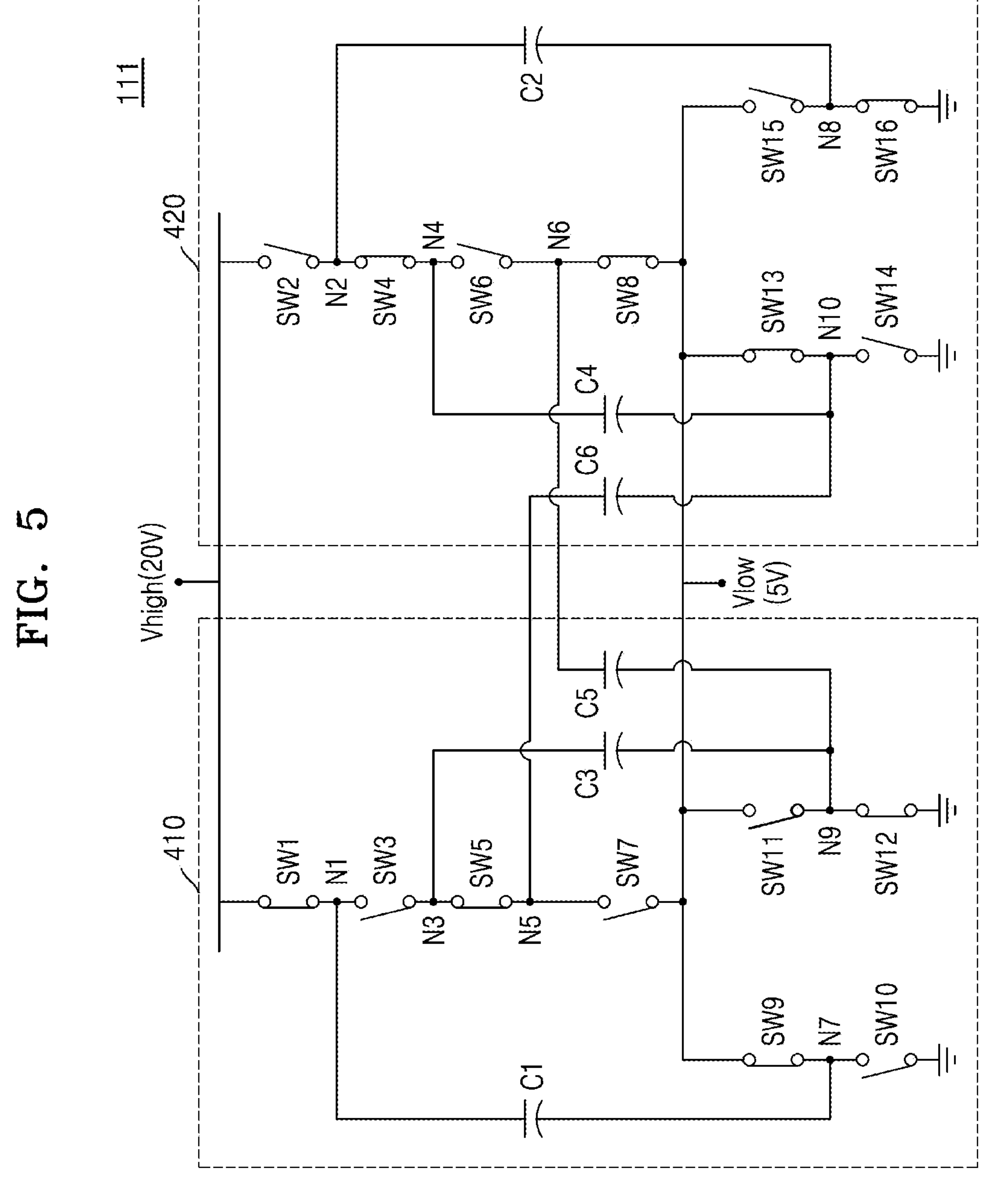
FIGS. 5 and 6 are circuit diagrams of a switched capacitor circuit in first and second switching modes, respectively, according to some example embodiments.
Figure 6:
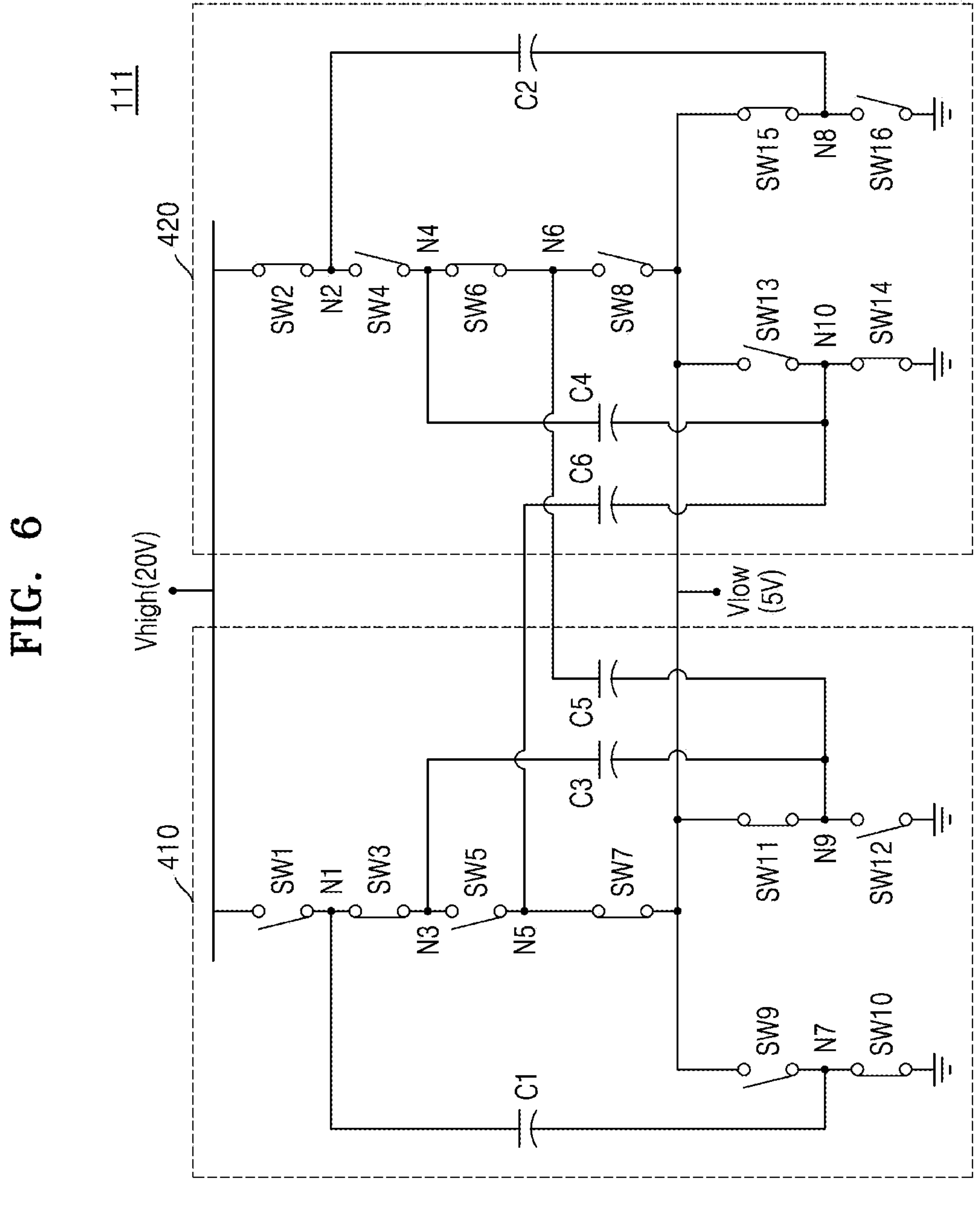
Figure 7:
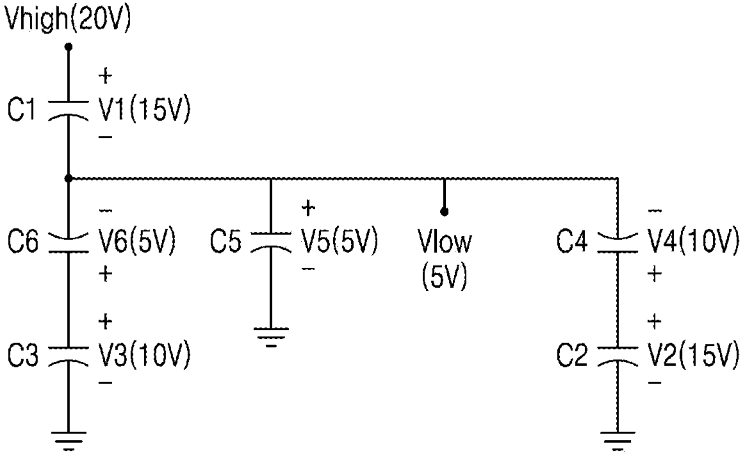
FIGS. 7 and 8 are equivalent circuit diagrams of a switched capacitor circuit in first and second switching modes, respectively, according to some example embodiments.
Figure 8:
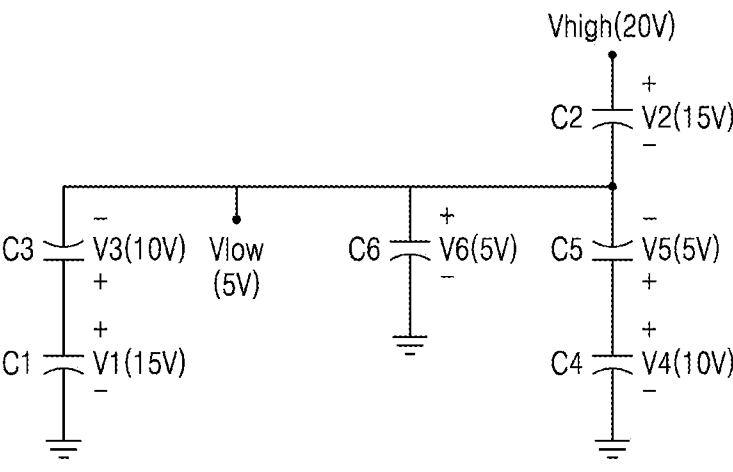

FIG. 4 is a timing diagram of control signals during a 4:1 buck converting operation according to some example embodiments, FIGS. 5 and 6 are circuit diagrams of a switched capacitor circuit in first and second switching modes, respectively, according to some example embodiments, and FIGS. 7 and 8 are equivalent circuit diagrams of a switched capacitor circuit in first and second switching modes, respectively, according to some example embodiments.

Referring to FIG. 4, during voltage conversion, the charger IC 100 (e.g., the switched capacitor circuit 111, the switching controller 120, the bidirectional switching converter 110, or any combination thereof) may operate alternately in (e.g., alternate between operating in) a first switching mode SM1 and a second switching mode SM2. In FIGS. 4 to 8, the voltage (also referred to herein interchangeably as a voltage level) of the node Vhigh may be stepped down to ¼, and the stepped-down voltage may be provided to the node Vlow. In FIGS. 5 to 8, the voltage (also referred to herein interchangeably as a voltage level) of the node Vhigh may be 20 V and the voltage of the node Vlow may be 5 V.

The switching controller 120 may generate a first phase control signal CTRL_P1 and a second phase control signal CTRL_P2. The phase of the first phase control signal CTRL_P1 may be opposite to the phase of the second phase control signal CTRL_P2.

During a 4:1 buck converting operation, the switching controller 120 may provide the first phase control signal CTRL_P1 as the control signals C_CTRL1, C_CTRL4, C_CTRL5, C_CTRL8, C_CTRL9, C_CTRL12, C_CTRL13, and C_CTRL16 and the switching controller 120 may provide the second phase control signal CTRL_P2 as the control signals C_CTRL2, C_CTRL3, C_CTRL6, C_CTRL7, C_CTRL10, C_CTRL11, C_CTRL14, and C_CTRL15.

In the first switching mode SM1 (e.g., based on the switched capacitor circuit 111, the switching controller 120, the bidirectional switching converter 110, or any combination thereof operating in the first switching mode SM1), the switching controller 120 may cause the control signals C_CTRL1, C_CTRL4, C_CTRL5, C_CTRL8, C_CTRL9, C_CTRL12, C_CTRL13, and C_CTRL16 to have a high level (e.g., a first voltage magnitude or voltage level) and the switching controller 120 may cause the control signals C_CTRL2, C_CTRL3, C_CTRL6, C_CTRL7, C_CTRL10, C_CTRL11, C_CTRL14, and C_CTRL15 to have a low level (e.g., a second voltage magnitude or voltage level that is smaller than the first voltage magnitude or voltage level).

In the second switching mode SM2 (e.g., based on the switched capacitor circuit 111, the switching controller 120, the bidirectional switching converter 110, or any combination thereof operating in the second switching mode SM2), the switching controller 120 may cause the control signals C_CTRL1, C_CTRL4, C_CTRL5, C_CTRL8, C_CTRL9, C_CTRL12, C_CTRL13, and C_CTRL16 to have a low level (e.g., the second voltage magnitude or voltage level) and the switching controller 120 may cause the control signals C_CTRL2, C_CTRL3, C_CTRL6, C_CTRL7, C_CTRL10, C_CTRL11, C_CTRL14, and C_CTRL15 to have a high level (e.g., the first voltage magnitude or voltage level).

In the first switching mode SM1 of FIG. 5, first, fourth, fifth, eighth, ninth, twelfth, thirteenth, and sixteenth switches SW1, SW4, SW5, SW8, SW9, SW12, SW13, and SW16 may be turned on based on the corresponding (e.g., separate, respective) control signals C_CTRL1, C_CTRL4, C_CTRL5, C_CTRL8, C_CTRL9, C_CTRL12, C_CTRL13, and C_CTRL16 having a high level and second, third, sixth, seventh, tenth, eleventh, fourteenth, and fifteenth switches SW2, SW3, SW6, SW7, SW10, SW11, SW14, and SW15 may be turned off based on the control signals C_CTRL2, C_CTRL3, C_CTRL6, C_CTRL7, C_CTRL10, C_CTRL11, C_CTRL14, and C_CTRL15 having a low level. As described herein, a switch that is "turned on" may be referred to interchangeably as being closed, being a closed switch, being in a closed state, being in a closed position, etc. such that the switch electrically connects, through the switch, the separate nodes to which the separate ends of the switch are connected, and a switch that is "turned off" may be referred to interchangeably as being open, being an open switch, being in an open state, being in an open position, etc. such that the switch electrically isolates, through the switch, the separate nodes to which the separate ends of the switch are connected. However, example embodiments are not limited thereto: in some example embodiments a switch that is "turned on" may be referred to interchangeably as being open, being an open switch, being in an open state, being in an open position, etc., and a switch that is "turned off" may be referred to interchangeably as being closed, being a closed switch, being in a closed state, being in a closed position, etc.

In the second switching mode SM2 of FIG. 6, the first, fourth, fifth, eighth, ninth, twelfth, thirteenth, and sixteenth switches SW1, SW4, SW5, SW8, SW9, SW12, SW13, and SW16 may be turned off based on the corresponding control signals C_CTRL1, C_CTRL4, C_CTRL5, C_CTRL8, C_CTRL9, C_CTRL12, C_CTRL13, and C_CTRL16 having a low level and the second, third, sixth, seventh, tenth, eleventh, fourteenth, and fifteenth switches SW2, SW3, SW6, SW7, SW10, SW11, SW14, and SW15 may be turned on based on the control signals C_CTRL2, C_CTRL3, C_CTRL6, C_CTRL7, C_CTRL10, C_CTRL11, C_CTRL14, and C_CTRL15 having a high level.

That is, referring to FIGS. 5 and 6, the first circuit structure 410 and the second circuit structure 420 have the same structure (e.g., a same or mirrored configuration of switches, nodes, and capacitors), and switches included in the first circuit structure 410 and the second circuit structure 420 may perform complementary operations. For example, when the first switch SW1 is turned on, the second switch SW2 may be turned off.

Referring to FIG. 7, in the first switching mode SM1, since the voltage of the node Vhigh is 20 V and the voltage of the node Vlow is 5 V, a voltage V1 of the first capacitor C1 may be 15 V (e.g., three times the voltage level of the node Vlow). Since the voltage of the node Vlow is 5 V, a voltage V5 of the fifth capacitor C5 may be 5 V (e.g., a same voltage level as the voltage level of the node Vlow). The voltage (e.g., a magnitude of the voltage) may be referred to herein interchangeably as a voltage level.

Referring to FIGS. 7-8, due to the complementary operation of the first circuit structure 410 and the second circuit structure 420, a voltage V2 of the second capacitor C2 may be 15 V and a voltage V6 of the sixth capacitor C6 may be 5 V in the second switching mode SM2 immediately before the first switching mode SM1.

Accordingly, referring to FIGS. 7-8, in the first and second switching modes SM1 and SM2, a voltage V1 of the first capacitor C1 may be 15 V (e.g., three times the voltage level of the node Vlow), a voltage V2 of the second capacitor C2 may be 15 V (e.g., three times the voltage level of the node Vlow), a voltage V3 of the third capacitor C3 may be 10 V (e.g., twice the voltage level of the node Vlow), a voltage V4 of the fourth capacitor C4 may be 10 V (e.g., twice the voltage level of the node Vlow), a voltage V5 of the fifth capacitor C5 may be 5 V (e.g., a same voltage level as the voltage level of the node Vlow), and a voltage V6 of the sixth capacitor C6 may be 5 V (e.g., a same voltage level as the voltage level of the node Vlow).

Therefore, in FIG. 7, in the first switching mode SM1, since the voltage V2 of the second capacitor C2 is 15 V and the voltage of the node Vlow is 5 V, a voltage V4 of the fourth capacitor C4 may be 10 V. Additionally, since a voltage V6 of the sixth capacitor C6 is 5 V and the voltage of the node Vlow is 5 V, a voltage V3 of the third capacitor C3 may be 10 V.

Referring to FIG. 8, in the second switching mode SM2, since the voltage of the node Vhigh is 20 V and the voltage of the node Vlow is 5 V, the voltage V2 of the second capacitor C2 may be 15 V. Since the voltage of the node Vlow is 5 V, the voltage V6 of the sixth capacitor C6 may be 5 V.

Referring to FIG. 7, due to the complementary operation of the first circuit structure 410 and the second circuit structure 420, the voltage V1 of the first capacitor C1 may be 15 V and the voltage V5 of the fifth capacitor C5 may be 5 V in the first switching mode SM1 immediately before the second switching mode SM2.

Therefore, in FIG. 8, in the second switching mode SM2, since the voltage V1 of the first capacitor C1 is 15 V and the voltage of the node Vlow is 5 V, the voltage V3 of the third capacitor C3 may be 10 V. Additionally, since the voltage V5 of the fifth capacitor C5 is 5 V and the voltage of the node Vlow is 5 V, the voltage V4 of the fourth capacitor C4 may be 10 V.

In FIGS. 7 and 8, although it is assumed that the battery 200 connected to the node Vlow is fully charged to the voltage of 5 V, some example embodiments are not limited thereto. That is, in a case where the voltage of the battery 200 is lower than 5 V, the first to sixth capacitors C1 to C6 having voltages V1 to V6 may be repeatedly charged and discharged. When the battery 200 is fully charged to the voltage of 5 V, the voltages V1 to V6 of the first to sixth capacitors C1 to C6 may reach the voltage levels shown in FIGS. 7 and 8.

Figure 9:
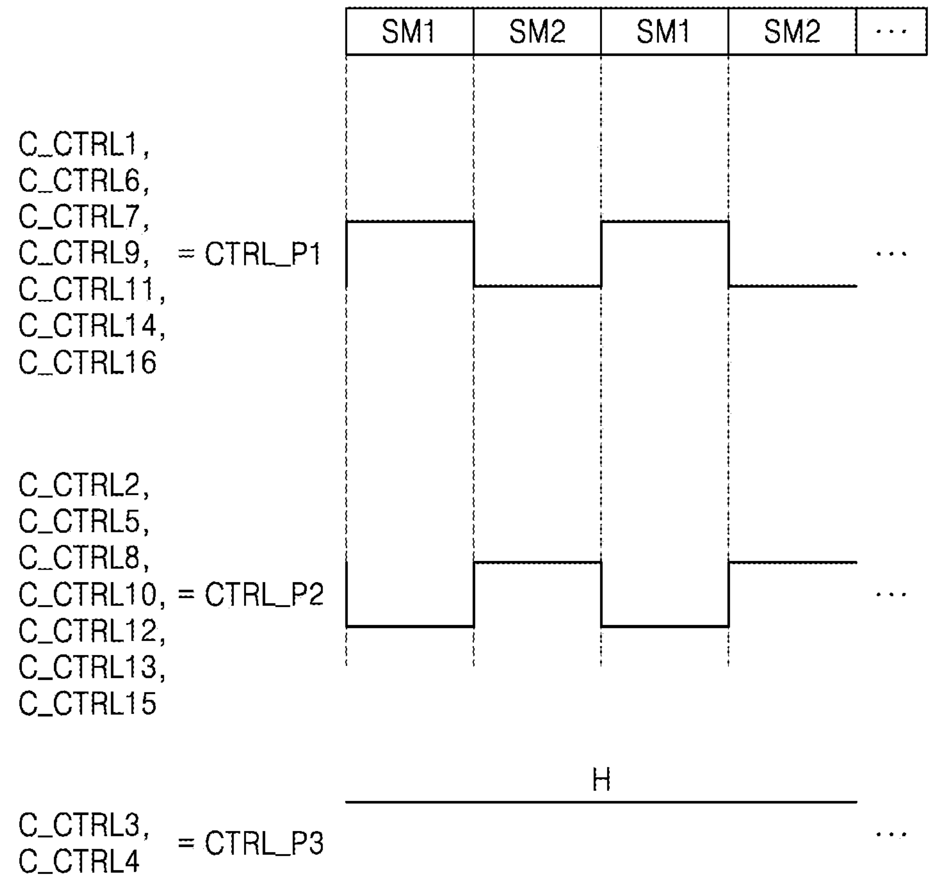
FIG. 9 is a timing diagram of control signals during a 3:1 buck converting operation according to some example embodiments.
Figure 10:
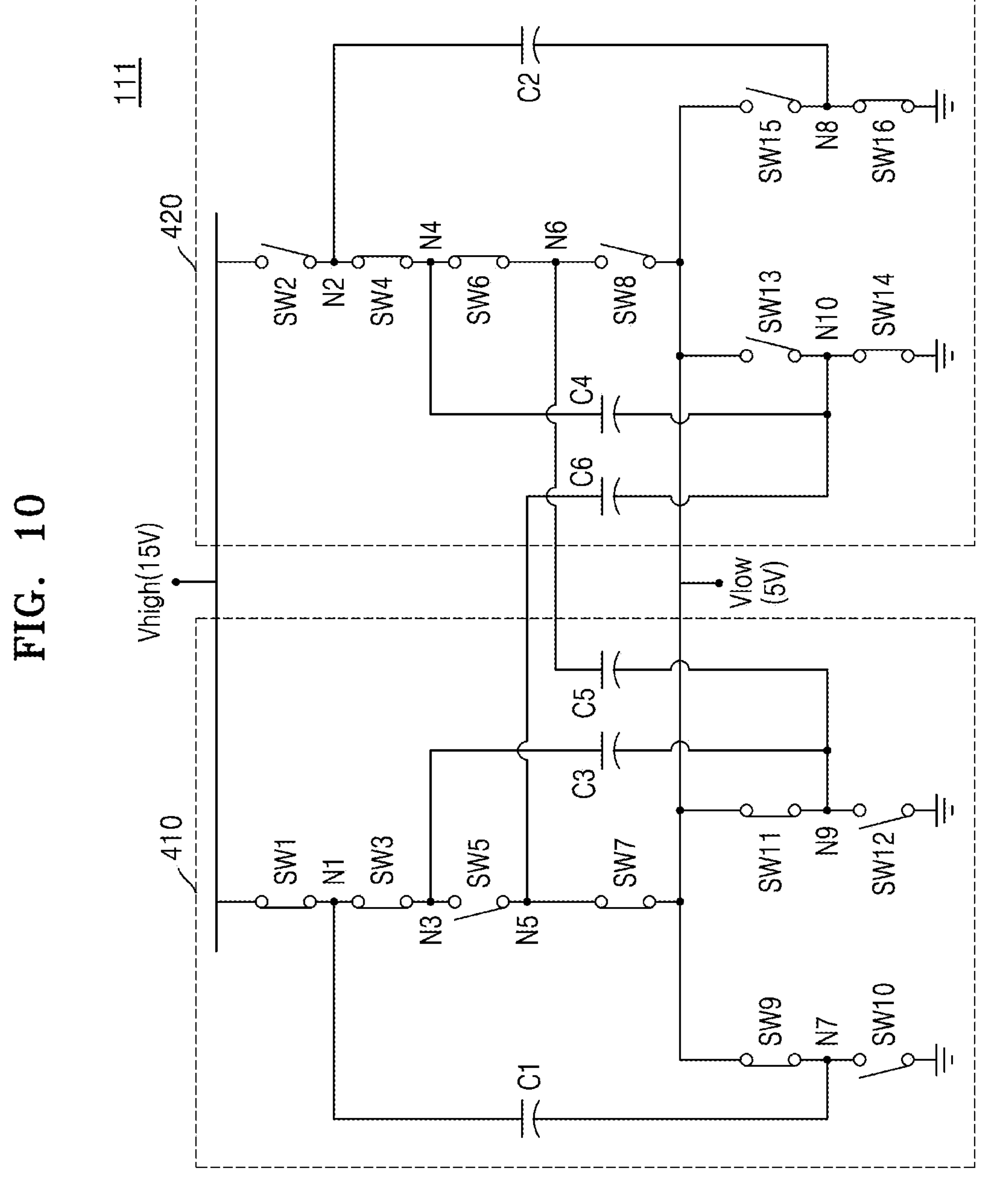
FIGS. 10 and 11 are circuit diagrams of a switched capacitor circuit in first and second switching modes, respectively, according to some example embodiments.
Figure 11:
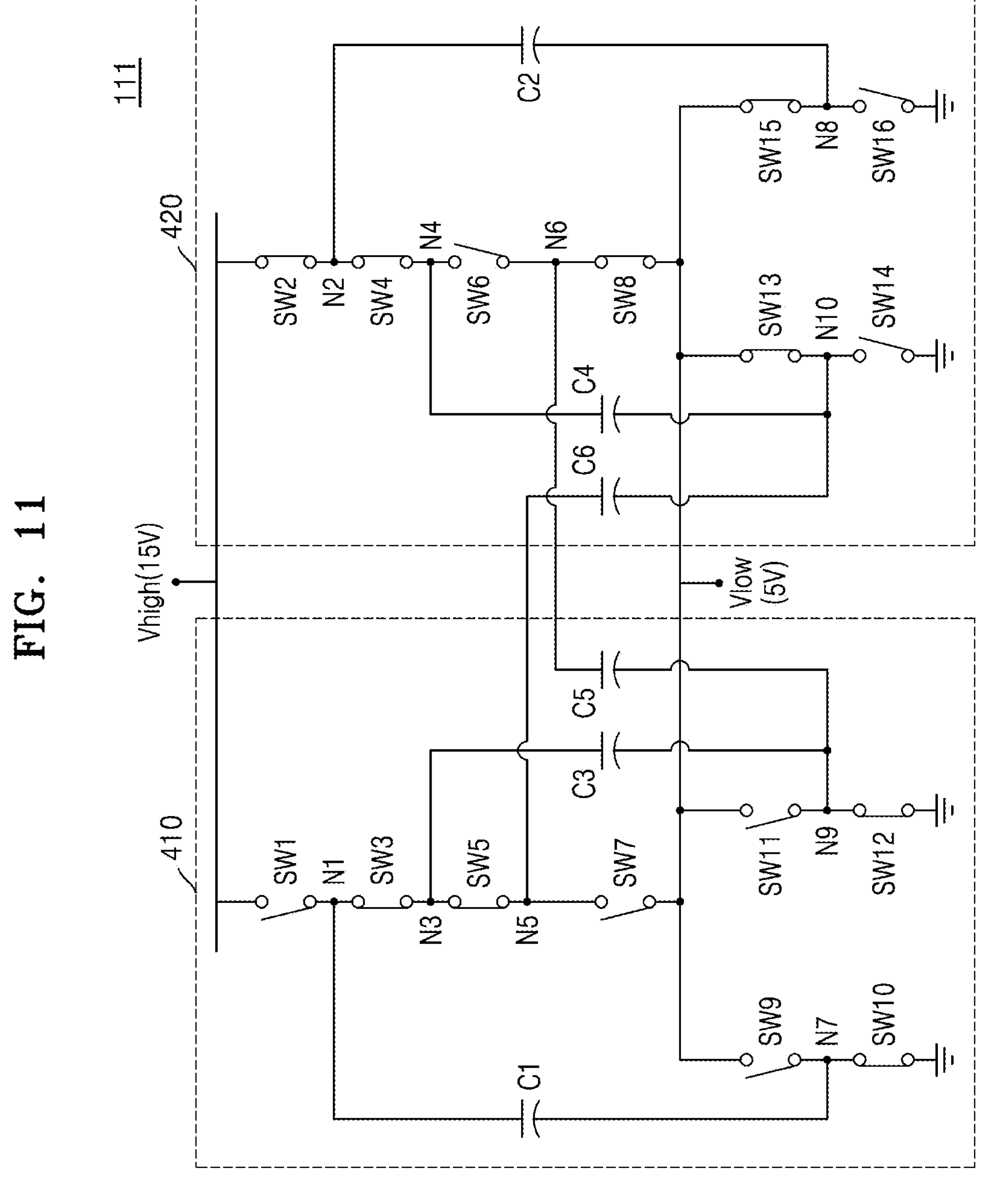
Figure 12:
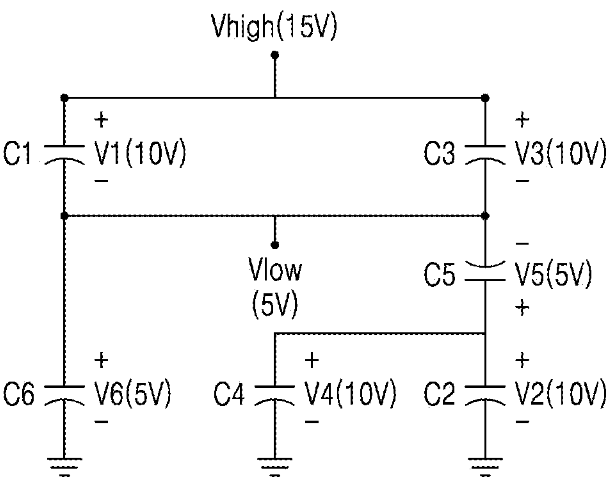
FIGS. 12 and 13 are equivalent circuit diagrams of a switched capacitor circuit in first and second switching modes, respectively, according to some example embodiments.
Figure 13:
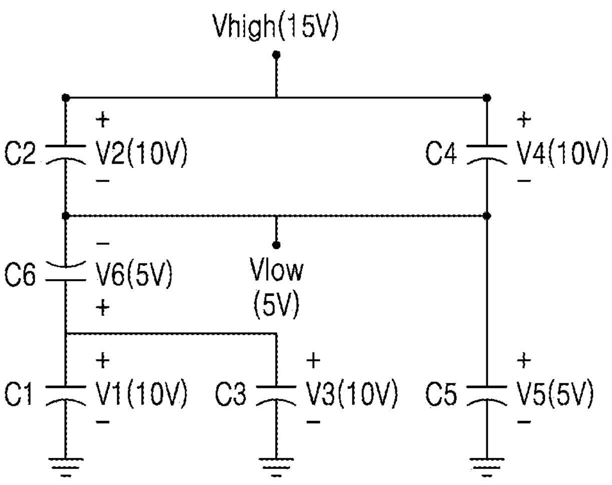

FIG. 9 is a timing diagram of control signals during a 3:1 buck converting operation according to some example embodiments, FIGS. 10 and 11 are circuit diagrams of a switched capacitor circuit in first and second switching modes, respectively, according to some example embodiments, and FIGS. 12 and 13 are equivalent circuit diagrams of a switched capacitor circuit in first and second switching modes, respectively, according to some example embodiments.

In FIGS. 9 to 13, the voltage of the node Vhigh may be stepped down to ⅓, and the stepped-down voltage may be provided to the node Vlow. In FIGS. 9 to 13, the voltage of the node Vhigh may be 15 V and the voltage of the node Vlow may be 5 V.

The switching controller 120 may generate a first phase control signal CTRL_P1, a second phase control signal CTRL_P2, and a third phase control signal CTRL_P3. The phase of the first phase control signal CTRL_P1 may be opposite to the phase of the second phase control signal CTRL_P2. The third phase control signal CTRL_P3 may maintain a high level during the buck converting operation.

During a 3:1 buck converting operation, the switching controller 120 may provide the first phase control signal CTRL_P1 as the control signals C_CTRL1, C_CTRL6, C_CTRL7, C_CTRL9, C_CTRL11, C_CTRL14, and C_CTRL16, the switching controller 120 may provide the second phase control signal CTRL_P2 as the control signals C_CTRL2, C_CTRL5, C_CTRL8, C_CTRL10, C_CTRL12, C_CTRL13, and C_CTRL15, and the switching controller 120 may provide the third phase control signal CTRL_P3 as the control signals C_CTRL3 and C_CTRL4.

In the first switching mode SM1 (e.g., based on the switched capacitor circuit 111, the switching controller 120, the bidirectional switching converter 110, or any combination thereof operating in the first switching mode SM1), the switching controller 120 may cause the control signals C_CTRL1, C_CTRL6, C_CTRL7, C_CTRL9, C_CTRL11, C_CTRL14, and C_CTRL16 to have a high level, the switching controller 120 may cause the control signals C_CTRL2, C_CTRL5, C_CTRL8, C_CTRL10, C_CTRL12, C_CTRL13, and C_CTRL15 to have a low level, and the switching controller 120 may cause the control signals C_CTRL3 and C_CTRL4 to have a high level.

In the second switching mode SM2 (e.g., based on the switched capacitor circuit 111, the switching controller 120, the bidirectional switching converter 110, or any combination thereof operating in the second switching mode SM2), the switching controller 120 may cause the control signals C_CTRL1, C_CTRL6, C_CTRL7, C_CTRL9, C_CTRL11, C_CTRL14, and C_CTRL16 to have a low level, the switching controller 120 may cause the control signals C_CTRL2, C_CTRL5, C_CTRL8, C_CTRL10, C_CTRL12, C_CTRL13, and C_CTRL15 to have a high level, and the switching controller 120 may cause the control signals C_CTRL3 and C_CTRL4 to have a high level.

In the first switching mode SM1 of FIG. 10, the first, third, fourth, sixth, seventh, ninth, eleventh, fourteenth, and sixteenth switches SW1, SW3, SW4, SW6, SW7, SW9, SW11, SW14, and SW16 may be turned on and the second, fifth, eighth, tenth, twelfth, thirteenth, and fifteenth switches SW2, SW5, SW8, SW10, SW12, SW13, and SW15 may be turned off.

In the second switching mode SM2 of FIG. 11, the first, sixth, seventh, ninth, eleventh, fourteenth, and sixteenth switches SW1, SW6, SW7, SW9, SW11, SW14, and SW16 may be turned off and the second, third, fourth, fifth, eighth, tenth, twelfth, thirteenth, and fifteenth switches SW2, SW3, SW4, SW5, SW8, SW10, SW12, SW13, and SW15 may be turned on.

That is, referring to FIGS. 10 and 11, the first circuit structure 410 and the second circuit structure 420 have the same structure (e.g., a same or mirrored configuration of switches, nodes, and capacitors), and switches SW1 to SW16 included in the first circuit structure 410 and the second circuit structure 420 other than the third and fourth switches SW3 and SW4 may perform complementary operations. For example, when the first switch SW1 is turned on, the second switch SW2 may be turned off. The third and fourth switches SW3 and SW4 may all remain turned on.

Referring to FIG. 12, in the first switching mode SM1, since the voltage of the node Vhigh is 15 V and the voltage of the node Vlow is 5 V, the voltages V1 and V3 of the first and third capacitors C1 and C3 may be 10 V. Since the voltage of the node Vlow is 5 V, the voltage V6 of the sixth capacitor C6 may be 5 V.

Referring to FIG. 13, due to the complementary operation of the first circuit structure 410 and the second circuit structure 420, the voltages V2 and V4 of the second and fourth capacitors C2 and C4 may be 10 V and the voltage V5 of the fifth capacitor C5 may be 5 V in the second switching mode SM2 immediately before the first switching mode SM1.

Therefore, in FIG. 12, in the first switching mode SM1, the voltages V2 and V4 of the second and fourth capacitors C2 and C4 may be 10 V and the voltage V5 of the fifth capacitor C5 may be 5 V.

Referring to FIG. 13, in the second switching mode SM2, since the voltage of the node Vhigh is 15 V and the voltage of the node Vlow is 5 V, the voltages V2 and V4 of the second and fourth capacitors C2 and C4 may be 10 V. Since the voltage of the node Vlow is 5 V, the voltage V5 of the fifth capacitor C5 may be 5 V.

Referring to FIG. 12, due to the complementary operation of the first circuit structure 410 and the second circuit structure 420, the voltages V1 and V3 of the first and third capacitors C1 and C3 may be 10 V and the voltage V6 of the sixth capacitor C6 may be 5 V in the first switching mode SM1 immediately before the second switching mode SM2.

Therefore, in FIG. 13, in the second switching mode SM2, the voltages V1 and V3 of the first and third capacitors C1 and C3 may be 10 V and the voltage V6 of the sixth capacitor C6 may be 5 V.

Accordingly, referring to FIGS. 12-13, in the first and second switching modes SM1 and SM2, a voltage V1 of the first capacitor C1 may be 10 V (e.g., twice the voltage level of the node Vlow), a voltage V2 of the second capacitor C2 may be 10 V (e.g., twice the voltage level of the node Vlow), a voltage V3 of the third capacitor C3 may be 10 V (e.g., twice the voltage level of the node Vlow), a voltage V4 of the fourth capacitor C4 may be 10 V (e.g., twice the voltage level of the node Vlow), a voltage V5 of the fifth capacitor C5 may be 5 V (e.g., a same voltage level as the voltage level of the node Vlow), and a voltage V6 of the sixth capacitor C6 may be 5 V (e.g., a same voltage level as the voltage level of the node Vlow).

In FIGS. 12 and 13, although it is assumed that the battery 200 connected to the node Vlow is fully charged to the voltage of 5 V, some example embodiments are not limited thereto. That is, in a case where the voltage of the battery 200 is lower than 5 V, the first to sixth capacitors C1 to C6 having voltages V1 to V6 may be repeatedly charged and discharged. When the battery 200 is fully charged to the voltage of 5 V, the voltages V1 to V6 of the first to sixth capacitors C1 to C6 may reach the voltage levels shown in FIGS. 12 and 13.

Figure 14:
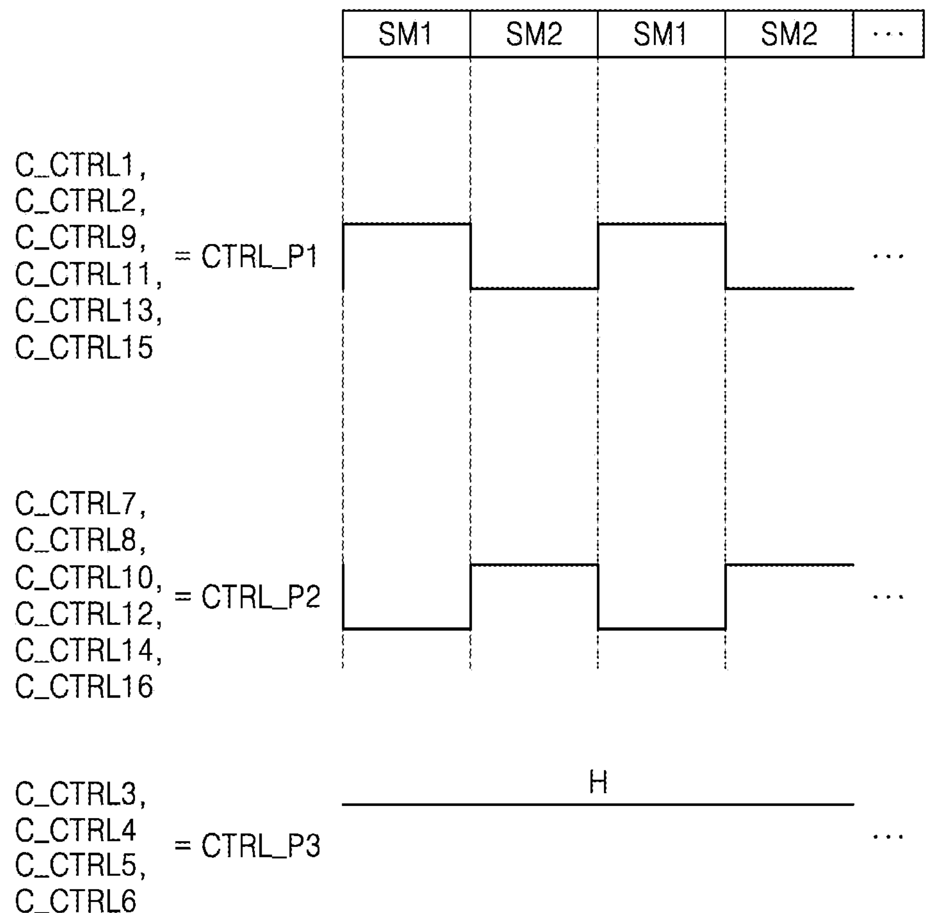
FIG. 14 is a timing diagram of control signals during a 2:1 buck converting operation according to some example embodiments.
Figure 15:
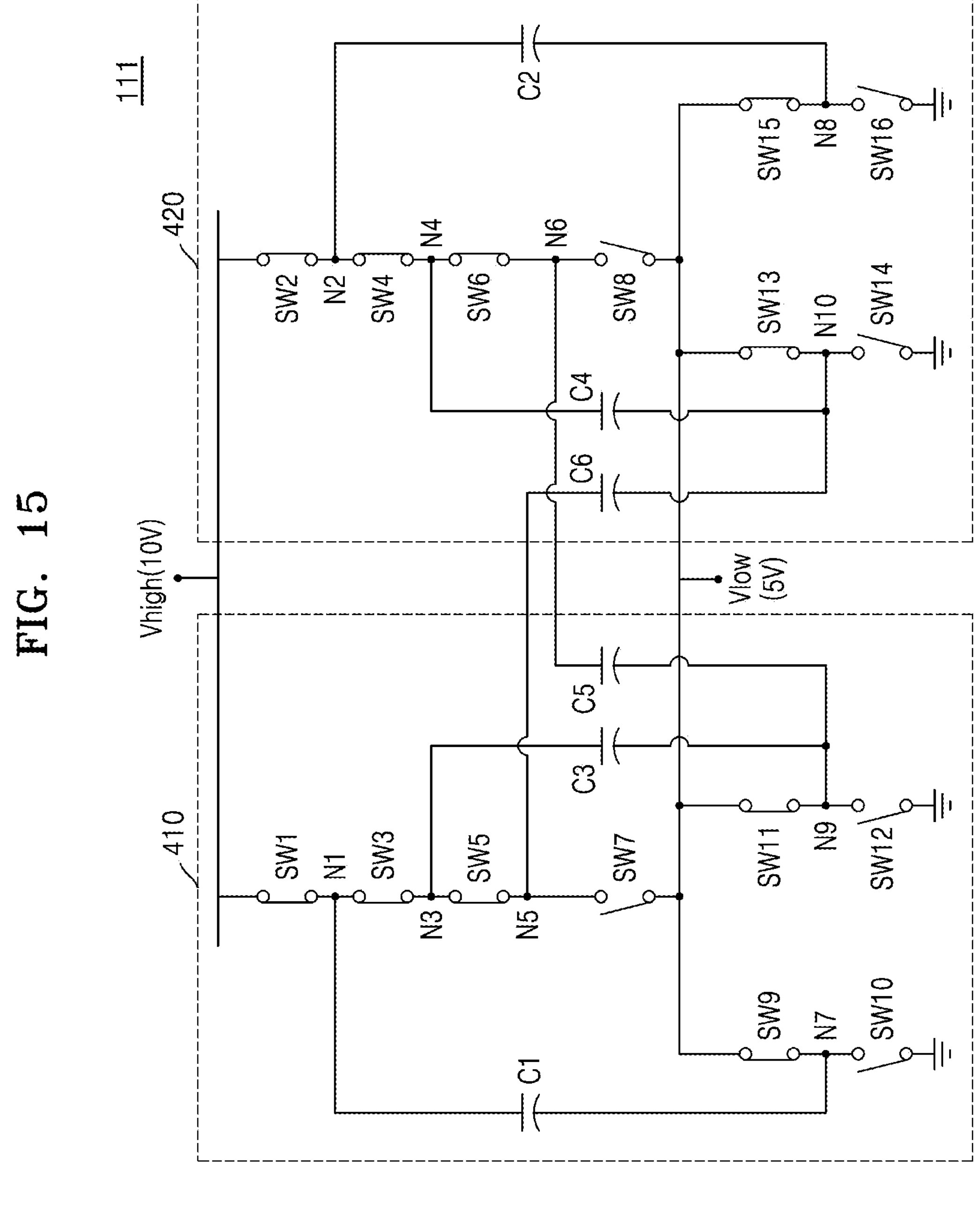
FIGS. 15 and 16 are circuit diagrams of a switched capacitor circuit in first and second switching modes, respectively, according to some example embodiments.
Figure 16:
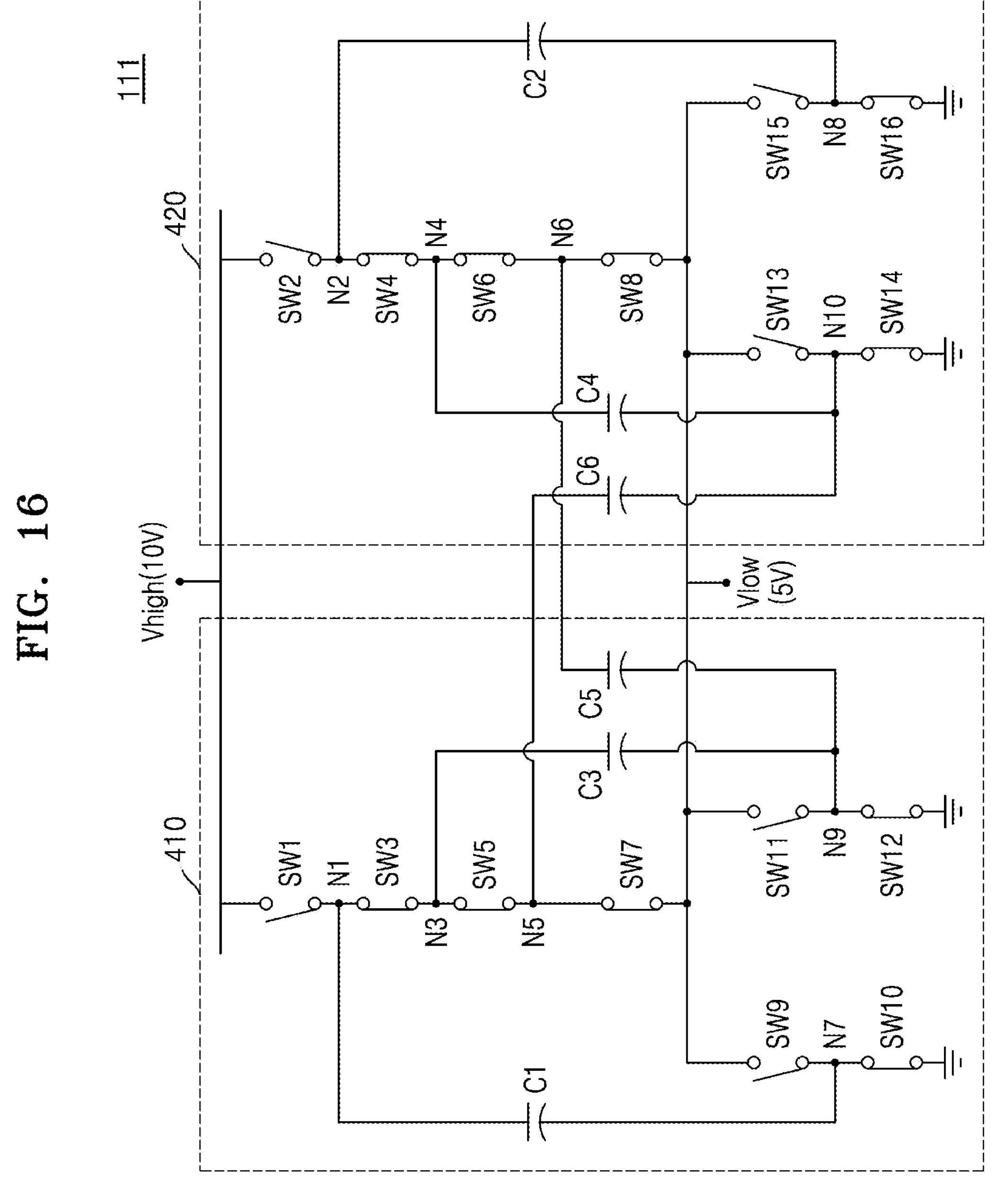
Figure 17:
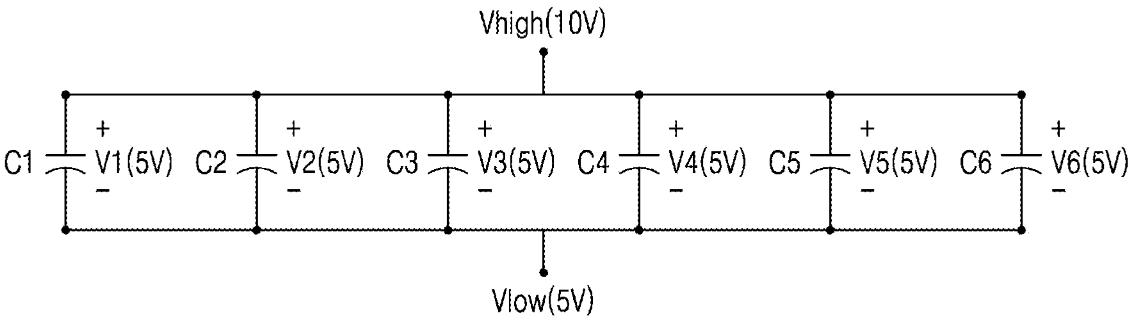
FIGS. 17 and 18 are equivalent circuit diagrams of a switched capacitor circuit in first and second switching modes, respectively, according to some example embodiments.
Figure 18:
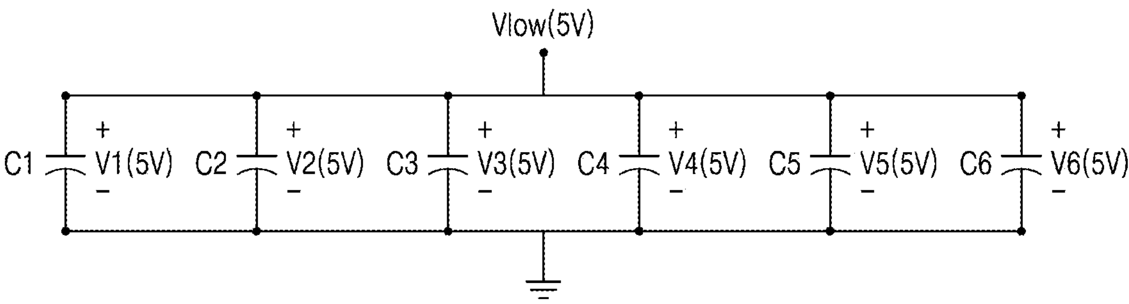

FIG. 14 is a timing diagram of control signals during a 2:1 buck converting operation according to some example embodiments, FIGS. 15 and 16 are circuit diagrams of a switched capacitor circuit in first and second switching modes, respectively, according to some example embodiments, and FIGS. 17 and 18 are equivalent circuit diagrams of a switched capacitor circuit in first and second switching modes, respectively, according to some example embodiments.

In FIGS. 14 to 18, the voltage of the node Vhigh may be stepped down to ½, and the stepped-down voltage may be provided to the node Vlow. In FIGS. 14 to 18, the voltage of the node Vhigh may be 10 V and the voltage of the node Vlow may be 5 V.

The switching controller 120 may generate the first phase control signal CTRL_P1, the second phase control signal CTRL_P2, and the third phase control signal CTRL_P3. The phase of the first phase control signal CTRL_P1 may be opposite to the phase of the second phase control signal CTRL_P2. The third phase control signal CTRL_P3 may maintain a high level during the buck converting operation.

During a 2:1 buck converting operation, the switching controller 120 may provide the first phase control signal CTRL_P1 as the control signals C_CTRL1, C_CTRL2, C_CTRL9, C_CTRL11, C_CTRL13, and C_CTRL15, the switching controller 120 may provide the second phase control signal CTRL_P2 as the control signals C_CTRL7, C_CTRL8, C_CTRL10, C_CTRL12, C_CTRL14, and C_CTRL16, and the switching controller 120 may provide the third phase control signal CTRL_P3 as the control signals C_CTRL3, C_CTRL4, C_CTRL5, and C_CTRL6.

In the first switching mode SM1 (e.g., based on the switched capacitor circuit 111, the switching controller 120, the bidirectional switching converter 110, or any combination thereof operating in the first switching mode SM1), the switching controller 120 may cause the control signals C_CTRL1, C_CTRL2, C_CTRL9, C_CTRL11, C_CTRL13, and C_CTRL15 to have a high level, the switching controller 120 may cause the control signals C_CTRL7, C_CTRL8, C_CTRL10, C_CTRL12, C_CTRL14, and C_CTRL16 to have a low level, and the switching controller 120 may cause the control signals C_CTRL3, C_CTRL4, C_CTRL5, and C_CTRL6 to have a high level.

In the second switching mode SM2 (e.g., based on the switched capacitor circuit 111, the switching controller 120, the bidirectional switching converter 110, or any combination thereof operating in the second switching mode SM2), the switching controller 120 may cause the control signals C_CTRL1, C_CTRL2, C_CTRL9, C_CTRL11, C_CTRL13, and C_CTRL15 to have a low level, the switching controller 120 may cause the control signals C_CTRL7, C_CTRL8, C_CTRL10, C_CTRL12, C_CTRL14, and C_CTRL16 to have a high level, and the switching controller 120 may cause the control signals C_CTRL3, C_CTRL4, C_CTRL5, and C_CTRL6 to have a high level.

In the first switching mode SM1 of FIG. 15, the first, second, third, fourth, fifth, sixth, ninth, eleventh, thirteenth, and fifteenth switches SW1, SW2, SW3, SW4, SW5, SW6, SW9, SW11, SW13, and SW15 may be turned on and the seventh, eighth, tenth, twelfth, fourteenth, and sixteenth switches SW7, SW8, SW10, SW12, SW14, and SW16 may be turned off.

In the second switching mode SM2 of FIG. 16, the first, second, ninth, eleventh, thirteenth, and fifteenth switches SW1, SW2, SW9, SW11, SW13, and SW15 may be turned off and the third, fourth, fifth, sixth, seventh, eighth, tenth, twelfth, fourteenth, and sixteenth switches SW3, SW4, SW5, SW6, SW7, SW8, SW10, SW12, SW14, and SW16 may be turned on.

That is, referring to FIGS. 15 and 16, the first circuit structure 410 and the second circuit structure 420 have the same structure (e.g., a same or mirrored configuration of switches, nodes, and capacitors), and switches SW1 to SW16 included in the first circuit structure 410 and the second circuit structure 420 other than the third, fourth, fifth, and sixth switches SW3, SW4, SW5, and SW6 may perform complementary operations. For example, when the first switch SW1 is turned on, the second switch SW2 may be turned off. The third, fourth, fifth, and sixth switches SW3, SW4, SW5, and SW6 may all remain turned on.

Referring to FIG. 17, in the first switching mode SM1, since the voltage of the node Vhigh is 10 V and the voltage of the node Vlow is 5 V, the voltages V1 to V6 of the first to sixth capacitors C1 to C6 may be 5 V (e.g., a same voltage level as a voltage level of the node Vlow).

Referring to FIG. 18, in the second switching mode SM2, since the voltage of the node Vlow is 5 V, the voltages V1 to V6 of the first to sixth capacitors C1 to C6 may be 5 V.

In FIGS. 17 and 18, although it is assumed that the battery 200 connected to the node Vlow is fully charged to the voltage of 5 V, some example embodiments are not limited thereto. That is, in a case where the voltage of the battery 200 is lower than 5 V, the first to sixth capacitors C1 to C6 having voltages V1 to V6 may be repeatedly charged and discharged. When the battery 200 is fully charged to the voltage of 5 V, the voltages V1 to V6 of the first to sixth capacitors C1 to C6 may reach the voltage levels shown in FIGS. 17 and 18.

As described herein, any devices, systems, modules, portions, units, controllers, circuits, and/or portions thereof according to any of the example embodiments, and/or any portions thereof (including, without limitation, the electronic device 10, the charger IC 100, the bidirectional switching converter 110, the switched capacitor circuit 111, the switching controller 120, the battery 200, the first power interface 310, the second power interface 320, any portion thereof, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a computer readable storage device (e.g., a memory) storing a program of instructions, for example a solid state drive (SSD), for example a non-transitory computer readable storage device, and the processing circuitry may further include a processor (e.g., CPU) configured to execute the program of instructions to implement the functionality and/or methods performed by some or all of any devices, systems, modules, portions, units, controllers, circuits, and/or portions thereof according to any of the example embodiments.

While the inventive concepts have been particularly shown and described with reference to some example embodiments thereof, it will be understood that various changes in form and details may be made therein without departing from the spirit and scope of the following claims.

What is claimed is:

1. A switched capacitor circuit, comprising:

a first switch having one end connected to an input node and another end connected to a first node;

a second switch having one end connected to the input node and another end connected to a second node;

a third switch having one end connected to the first node and another end connected to a third node;

a fourth switch having one end connected to the second node and another end connected to a fourth node;

a fifth switch having one end connected to the third node and another end connected to a fifth node;

a sixth switch having one end connected to the fourth node and another end connected to a sixth node;

a seventh switch having one end connected to the fifth node and another end connected to an output node;

an eighth switch having one end connected to the sixth node and another end connected to the output node;

a ninth switch having one end connected to the output node and another end connected to a seventh node;

a tenth switch having one end connected to the seventh node and another end connected to a first ground node;

an eleventh switch having one end connected to the output node and another end connected to a ninth node;

a twelfth switch having one end connected to the ninth node and another end connected to a second ground node;

a thirteenth switch having one end connected to the output node and another end connected to a tenth node;

a fourteenth switch having one end connected to the tenth node and another end connected to a third ground node;

a fifteenth switch having one end connected to the output node and another end connected to an eighth node;

a sixteenth switch having one end connected to the eighth node and another end connected to a fourth ground node;

a first capacitor connected between the first node and the seventh node;

a second capacitor connected between the second node and the eighth node;

a third capacitor connected between the third node and the ninth node;

a fourth capacitor connected between the fourth node and the tenth node;

a fifth capacitor connected between the sixth node and the ninth node; and a sixth capacitor connected between the fifth node and the tenth node.

2. The switched capacitor circuit of claim 1, wherein the switched capacitor circuit is configured to, based on operating in a first switching mode in a converting operation based on a first voltage conversion ratio cause the first, fourth, fifth, eighth, ninth, twelfth, thirteenth, and sixteenth switches to be turned on, and cause the second, third, sixth, seventh, tenth, eleventh, fourteenth, and fifteenth switches to be turned off.

3. The switched capacitor circuit of claim 2, wherein the switched capacitor circuit is configured to, based on operating in a second switching mode in the converting operation based on the first voltage conversion ratio cause the first, fourth, fifth, eighth, ninth, twelfth, thirteenth, and sixteenth switches to be turned off, and cause the second, third, sixth, seventh, tenth, eleventh, fourteenth, and fifteenth switches to be turned on.

4. The switched capacitor circuit of claim 3, wherein the switched capacitor circuit is configured to, based on operating in the first and second switching modes, cause the first and second capacitors to be charged to a voltage level that is three times a voltage level of the output node, cause the third and fourth capacitors to be charged to a voltage level that is twice the voltage level of the output node, and cause the fifth and sixth capacitors to be charged to a voltage level that is a same voltage level as the voltage level of the output node.

5. The switched capacitor circuit of claim 1, wherein the switched capacitor circuit is configured to, based on operating in a first switching mode in a converting operation based on a second voltage conversion ratio, cause the first, third, fourth, sixth, seventh, ninth, eleventh, fourteenth, and sixteenth switches to be turned on, and cause the second, fifth, eighth, tenth, twelfth, thirteenth, and fifteenth switches to be turned off.

6. The switched capacitor circuit of claim 5, wherein the switched capacitor circuit is configured to, based on operating in a second switching mode in the converting operation based on the second voltage conversion ratio, cause the first, sixth, seventh, ninth, eleventh, fourteenth, and sixteenth switches to be turned off, and cause the second, third, fourth, fifth, eighth, tenth, twelfth, thirteenth, and fifteenth switches to be turned on.

7. The switched capacitor circuit of claim 6, wherein the switched capacitor circuit is configured to, based on operating in the first and second switching modes, cause the first to fourth capacitors to be charged to a voltage level that is twice a voltage level of the output node, and cause the fifth and sixth capacitors to be charged to a voltage level that is a same voltage level as the voltage level of the output node.

8. The switched capacitor circuit of claim 1, wherein the switched capacitor circuit is configured to, based on operating in a first switching mode in a converting operation based on a third voltage conversion ratio, cause the first, second, third, fourth, fifth, sixth, ninth, eleventh, thirteenth, and fifteenth switches to be turned on, and cause the seventh, eighth, tenth, twelfth, fourteenth, and sixteenth switches to be turned off.

9. The switched capacitor circuit of claim 8, wherein the switched capacitor circuit is configured to, based on operating in a second switching mode in the converting operation based on the third voltage conversion ratio, cause the first, second, ninth, eleventh, thirteenth, and fifteenth switches to be turned off, and cause the third, fourth, fifth, sixth, seventh, eighth, tenth, twelfth, fourteenth, and sixteenth switches to be turned on.

10. The switched capacitor circuit of claim 9, wherein the switched capacitor circuit is configured to, based on operating in the first and second switching modes, cause the fifth to sixth capacitors to be charged to a voltage level that is a same voltage level as a voltage level of the output node.

11. A charger integrated circuit, comprising:

a switched capacitor circuit, the switched capacitor circuit including a first switch having one end connected to a first input/output node and another end connected to a first node, a second switch having one end connected to the first input/output node and another end connected to a second node, a third switch having one end connected to the first node and another end connected to a third node, a fourth switch having one end connected to the second node and another end connected to a fourth node, a fifth switch having one end connected to the third node and another end connected to a fifth node, a sixth switch having one end connected to the fourth node and another end connected to a sixth node, a seventh switch having one end connected to the fifth node and another end connected to a second input/output node, an eighth switch having one end connected to the sixth node and another end connected to the second input/output node, a ninth switch having one end connected to the second input/output node and another end connected to a seventh node, a tenth switch having one end connected to the seventh node and another end connected to a first ground node, an eleventh switch having one end connected to the second input/output node and another end connected to a ninth node, a twelfth switch having one end connected to the ninth node and another end connected to a second ground node, a thirteenth switch having one end connected to the second input/output node and another end connected to a tenth node, a fourteenth switch having one end connected to the tenth node and another end connected to a third ground node, a fifteenth switch having one end connected to the second input/output node and another end connected to an eighth node, a sixteenth switch having one end connected to the eighth node and another end connected to a fourth ground node, a first capacitor connected between the first node and the seventh node, a second capacitor connected between the second node and the eighth node, a third capacitor connected between the third node and the ninth node, a fourth capacitor connected between the fourth node and the tenth node, a fifth capacitor connected between the sixth node and the ninth node, and a sixth capacitor connected between the fifth node and the tenth node; and a switching controller configured to generate first to sixteenth control signals to control the first to sixteenth switches, respectively.

12. The charger integrated circuit of claim 11, wherein the charger integrated circuit is configured to perform a converting operation based on a first voltage conversion ratio, the converting operation including operating in a first switching mode such that the switching controller generates the first, fourth, fifth, eighth, ninth, twelfth, thirteenth, and sixteenth control signals to cause the first, fourth, fifth, eighth, ninth, twelfth, thirteenth, and sixteenth switches, respectively, to turn on, and the switching controller generates the second, third, sixth, seventh, tenth, eleventh, fourteenth, and fifteenth control signals to cause the second, third, sixth, seventh, tenth, eleventh, fourteenth, and fifteenth switches, respectively, to turn off.

13. The charger integrated circuit of claim 12, wherein the converting operation includes operating in a second switching mode such that the switching controller generates the first, fourth, fifth, eighth, ninth, twelfth, thirteenth, and sixteenth control signals to cause the first, fourth, fifth, eighth, ninth, twelfth, thirteenth, and sixteenth switches, respectively, to turn off, and the switching controller generates the second, third, sixth, seventh, tenth, eleventh, fourteenth, and fifteenth control signals to cause the second, third, sixth, seventh, tenth, eleventh, fourteenth, and fifteenth switches, respectively, to turn on.

14. The charger integrated circuit of claim 13, wherein the charger integrated circuit is configured to, based on operating in the first and second switching modes, cause the first and second capacitors to be charged to a voltage level that is three times a voltage level of the second input/output node, cause the third and fourth capacitors to be charged to a voltage level that is twice the voltage level of the second input/output node, and cause the fifth and sixth capacitors to be charged to a voltage level that is a same voltage level as the voltage level of the second input/output node.

15. The charger integrated circuit of claim 11, wherein the charger integrated circuit is configured to perform a converting operation based on a second voltage conversion ratio, the converting operation including operating in a first switching mode such that the switching controller generates the first, third, fourth, sixth, seventh, ninth, eleventh, fourteenth, and sixteenth control signals to cause the first, third, fourth, sixth, seventh, ninth, eleventh, fourteenth, and sixteenth switches, respectively, to turn on, and the switching controller generates the second, fifth, eighth, tenth, twelfth, thirteenth, and fifteenth control signals to cause the second, fifth, eighth, tenth, twelfth, thirteenth, and fifteenth switches, respectively, to turn off.

16. The charger integrated circuit of claim 15, wherein the converting operation includes operating in a second switching mode such that the switching controller generates the first, sixth, seventh, ninth, eleventh, fourteenth, and sixteenth control signals to cause the first, sixth, seventh, ninth, eleventh, fourteenth, and sixteenth switches, respectively, to turn off, and the switching controller generates the second, third, fourth, fifth, eighth, tenth, twelfth, thirteenth, and fifteenth control signals to cause the second, third, fourth, fifth, eighth, tenth, twelfth, thirteenth, and fifteenth switches, respectively, to turn on.

17. The charger integrated circuit of claim 16, wherein the charger integrated circuit is configured to, based on operating in the first and second switching modes, cause the first to fourth capacitors to be charged to a voltage level that is two times a voltage level of the second input/output node, and cause the fifth and sixth capacitors to be charged to a voltage level that is a same voltage level as the voltage level of the second input/output node.

18. The charger integrated circuit of claim 11, wherein the charger integrated circuit is configured to perform a converting operation based on a third voltage conversion ratio, the converting operation including operating in a first switching mode such that the switching controller generates the first, second, third, fourth, fifth, sixth, ninth, eleventh, thirteenth, and fifteenth control signals to cause the first, second, third, fourth, fifth, sixth, ninth, eleventh, thirteenth, and fifteenth switches, respectively, to turn on, and the switching controller generates the seventh, eighth, tenth, twelfth, fourteenth, and sixteenth control signals to cause the seventh, eighth, tenth, twelfth, fourteenth, and sixteenth switches, respectively, to turn off.

19. The charger integrated circuit of claim 18, wherein the converting operation includes operating in a second switching mode such that the switching controller generates the first, second, ninth, eleventh, thirteenth, and fifteenth control signals to cause the first, second, ninth, eleventh, thirteenth, and fifteenth switches, respectively, to turn off, and the switching controller generates the third, fourth, fifth, sixth, seventh, eighth, tenth, twelfth, fourteenth, and sixteenth control signals to cause the third, fourth, fifth, sixth, seventh, eighth, tenth, twelfth, fourteenth, and sixteenth switches, respectively, to turn on.

20. The charger integrated circuit of claim 19, wherein the charger integrated circuit is configured to, based on operating in the first and second switching modes, cause the first to sixth capacitors to be charged to a voltage level that is a same voltage level as a voltage level of the second input/output node.

* * * * *